United States Patent
Kono et al.

(10) Patent No.: US 8,661,220 B2
(45) Date of Patent: Feb. 25, 2014

(54) COMPUTER SYSTEM, AND BACKUP METHOD AND PROGRAM FOR COMPUTER SYSTEM

(75) Inventors: Misako Kono, Yokohama (JP);
Nobuhiro Maki, Yokohama (JP);
Hironori Emaru, Yokohama (JP);
Junichi Hara, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 913 days.

(21) Appl. No.: 12/764,543

(22) Filed: Apr. 21, 2010

(65) Prior Publication Data
US 2011/0202735 A1 Aug. 18, 2011

(30) Foreign Application Priority Data

Feb. 17, 2010 (JP) .................. 2010-031940

(51) Int. Cl.
*G06F 12/00* (2006.01)
(52) U.S. Cl.
USPC ........... 711/170; 711/161; 711/167; 711/114; 711/E12.002
(58) Field of Classification Search
USPC .............. 711/161, 162, 165, 170, 112, 114, 711/E12.002, 167
See application file for complete search history.

(56) References Cited

U.S. PATENT DOCUMENTS

| 7,159,072 | B2* | 1/2007 | Kitamura | 711/112 |
| 7,600,089 | B2* | 10/2009 | Muto et al. | 711/162 |
| 7,613,945 | B2 | 11/2009 | Soran et al. | |
| 2005/0071590 | A1 | 3/2005 | Watanabe et al. | |
| 2006/0218364 | A1* | 9/2006 | Kitamura | 711/162 |
| 2007/0088925 | A1* | 4/2007 | Shinozaki et al. | 711/162 |

FOREIGN PATENT DOCUMENTS

JP 2004-164318 A 6/2004

* cited by examiner

*Primary Examiner* — Pierre-Michel Bataille
(74) *Attorney, Agent, or Firm* — Foley & Lardner LLP

(57) ABSTRACT

A backup is completed within a backup window designated by a user.
When copying data in a first storage area, which is a backup target, to a second storage area, the capacity of a medium serving as a third storage area which is sufficient to complete a backup within the backup window, is calculated based on information about a differential bitmap describing an area in the second storage area to which the relevant data is copied from the first storage area, configuration information about a storage system where the storage areas are stored, and performance information about media constituting the storage areas; and differential data is copied using the second storage area and the third storage area; and the data written to the third storage area is copied to the second storage area.

20 Claims, 20 Drawing Sheets

FIG.3

| APPLICATION ID | SCHEDULE | BW | PVOL | | SVOL | |
|---|---|---|---|---|---|---|
| | | | STORAGE ID | VOLUME ID | STORAGE ID | VOLUME ID |
| AP001 | EVERY 30 MINUTES | 10 MINUTES | ST001 | VOL001 | ST002 | VOL002 |
| | | | | | | VOL003 |
| | | | | | | VOL004 |
| AP002 | AT 22:00 EVERY DAY | 60 MINUTES | ST001 | VOL006 | ST001 | VOL007 |
| ... | ... | ... | ... | ... | ... | ... |

| BACKUP ID ⸺4090 | APPLICATION ID ⸺4091 | BACKUP START TIME ⸺4092 | BACKUP COMPLETION TIME ⸺4093 | PVOL ⸺4094 | SVOL ⸺4095 |
|---|---|---|---|---|---|
| BK001 | AP001 | 2009/12/1 22:30 | 2009/12/1 22:45 | VOL001 | VOL002 |
| BK002 | AP001 | 2009/12/1 23:00 | — | VOL001 | VOL003 |
| BK003 | AP002 | 2009/12/1 23:00 | — | VOL005 | VOL006 |
| ... | ... | ... | ... | ... | ... |

*FIG.5*

| VOLUME LBA $_{\sim 4100}$ | UPDATE FLAG $_{\sim 4101}$ |
|---|---|
| LBA0000 | 1 |
| LBA0001 | 0 |
| LBA0002 | 0 |
| ... | ... |

FIG.6

| STORAGE ID 4110 | POOL ID 4111 | MEDIUM ID 4112 | MEDIUM TYPE 4113 | MEDIUM LBA AREA 4114 | PAGE ID 4115 | CAPA-CITY [MB] 4116 | VOLUME ID 4117 | VOLUME LBA AREA 4118 |
|---|---|---|---|---|---|---|---|---|
| ST001 | Pool 001 | MEDIUM 001 | HIGH-SPEED MEDIUM | LBA0000-0999 | Page001 | 10 | VOL 001 | LBA0000-0999 |
| | | | | LBA1000-1999 | Page002 | 10 | VOL 001 | LBA1000-1999 |
| | | | | LBA2000-2999 | Page003 | 10 | N/A | N/A |
| | | MEDIUM 002 | MEDIUM-SPEED MEDIUM | LBA0000-0999 | Page011 | 10 | VOL 001 | LBA3000-3999 |
| | | | | LBA1000-1999 | Page012 | 10 | N/A | N/A |
| | | | | LBA2000-2999 | Page013 | 10 | N/A | N/A |
| | | ... | ... | ... | ... | ... | ... | ... |
| | Pool 002 | MEDIUM 003 | LOW-SPEED MEDIUM | LBA0000-0999 | Page101 | 10 | VOL002 | LBA0000-0999 |
| | | | | LBA1000-1999 | Page102 | 10 | VOL002 | LBA1000-1999 |
| | | | | LBA2000-2999 | Page103 | 10 | VOL002 | LBA2000-2999 |
| | | | | LBA3000-3999 | Page104 | 10 | VOL003 | LBA0000-0999 |
| | | | | ... | ... | ... | ... | ... |
| ST001 | Cpool 001 | MEDIUM 004 | | LBA0000-5999 | Page501 | 50 | N/A | N/A |
| | | MEDIUM 005 | | LBA0000-5999 | Page502 | 50 | N/A | N/A |
| | | MEDIUM 006 | | LBA0000-5999 | Page503 | 50 | N/A | N/A |
| | ... | ... | ... | ... | ... | ... | ... | ... |
| ... | | | | | | | | |

FIG.7

| MEDIUM TYPE ⌐4120 | RANDOM READ PERFORMANCE ⌐4121 | RANDOM WRITE PERFORMANCE ⌐4122 |
|---|---|---|
| HIGH-SPEED MEDIUM | 50 MB/s | 10 MB/s |
| MEDIUM-SPEED MEDIUM | 0.1 MB/s | 0.1 MB/s |
| LOW-SPEED MEDIUM | 0.05 MB/s | 0.05 MB/s |

FIG.16

| APPLICATION ID | SCHEDULE | BW | PRIORITY | PVOL STORAGE ID | PVOL VOLUME ID | SVOL STORAGE ID | SVOL VOLUME ID |
|---|---|---|---|---|---|---|---|
| AP A | EVERY 30 MINUTES | 10 MINUTES | HIGH | STA | VOL001 | ST B | VOL002 |
|  |  |  |  |  |  |  | VOL003 |
|  |  |  |  |  |  |  | VOL004 |
| AP B | 22:00 EVERY DAY | 60 MINUTES | LOW | STA | VOL006 | STA | VOL007 |
| ... | ... | ... |  | ... | ... | ... | ... |

FIG. 20

<BACKUP TARGET APPLICATION INFORMATION>

| APPLICATION ID | AP001 |
|---|---|
| BACKUP WINDOW | 10 MINUTES |
| BACKUP TIME | 12 MINUTES |

<WARNING AND COUNTERMEASURE>

BACKUP WILL NOT BE COMPLETED WITHIN THE DESIGNATED BACKUP WINDOW IF THE CURRENT S-VOL MEDIUM IS USED. PLEASE ADD ANY OF THE FOLLOWING MEDIA TO S-VOL POOL IN ORDER TO COMPLETE BACKUP WITHIN THE BACKUP WINDOW.

| HIGH-SPEED MEDIUM | ○○Mbyte |
|---|---|
| MEDIUM-SPEED MEDIUM | △△MByte |

END

COMPUTER SYSTEM, AND BACKUP METHOD AND PROGRAM FOR COMPUTER SYSTEM

CROSS-REFERENCES TO RELATED APPLICATIONS

This application relates to and claims priority from Japanese Patent Application No. 2010-031940, filed on Feb. 17, 2010, the entire disclosure of which is incorporated herein by reference.

BACKGROUND

1. Field of the Invention

The invention relates generally to configuration management of a storage system. Particularly, the invention relates to management of storage areas at the time of backups.

2. Description of Related Art

Companies back up data as a means of precaution against failures of storage apparatuses, data destruction by computer viruses, and data loss due to users' incorrect operation. One of backup techniques is a method of using a storage copy function capable of curbing the influence on a host computer on which an application operates. When performing a backup, data written to a storage area of a storage apparatus which stores data used by the application (primary volume; hereinafter referred to as "PVOL") is copied to another storage area (secondary volume; hereinafter referred to as "SVOL"). Japanese Patent Laid-Open (Kokai) Application Publication No. 2004-164318 discloses split operation to cancel the copy state between the PVOL and the SVOL except when a designated backup is performed. The split operation is to manage differential data with a data change in the PVOL by stopping the copy function during the operation of the relevant application. After the task is completed, the application is stopped and the differential data is copied from the PVOL to the SVOL. This is because, if a backup is performed during the task, the load will be imposed on the PVOL, thereby degrading the storage performance.

Recently, a thin provisioning technique is used as a technique for efficiently utilizing the capacity of media in a storage system. This technique is to provide virtual volumes, which are virtual storage areas, to a computer and allocate a physical storage area only to an area for which a write request is made from among the virtual storage areas. Furthermore, U.S. Pat. No. 7,613,945 discloses a method for migrating data on a page basis, each page being a smaller segment than a volume, according to I/O (Input/Output) access frequency form a host computer. This technique can manage a plurality of types of media as a pool and migrate a high-access-frequency page to a high-speed medium and a low-access-frequency page to a low-speed medium.

SUMMARY

A backup is required to be performed during a limited period of time, for example, during out-of-service hours. Japanese Patent Laid-Open (Kokai) Application Publication No. 2004-164318 does not consider time it takes to back up data. Also, U.S. Pat. No. 7,613,945 does not consider copying of data between virtual volumes to which a plurality of types of media are allocated.

Therefore, when the amount of differential data increases, a backup may not sometimes be completed within a target period of time desired by a user to complete the backup (hereinafter referred to as the "backup window" or "BW"). In this case, the backup time can be reduced by adding a high-speed medium to the SVOL. However, the high-speed medium is expensive, and there is a demand for reduction of the capacity to be used.

A computer system including a management computer, a first storage apparatus having a first storage area, and a second storage apparatus that has a second storage area, in which a copy of data in the first storage area is stored, and a third storage area whose write speed is faster than that of the second storage area, executes the following processing. The management computer calculates the capacity of the third storage area to complete copying of differential data that is part of the data in the first storage area, which is not stored in the second storage area, within a specified period of time based on a read speed for the first storage area, a write speed for the second storage area, a write speed for the third storage area, and an amount of the differential data. If the capacity of the third storage area is larger than the calculated capacity, the second storage apparatus copies the differential data, which has been sent from the first storage area, to the second storage area or the third storage area and migrates the differential data, which has been copied to the third storage area, to the second storage area.

A backup can be completed within the BW by using a plurality of types of media with different performance.

BRIEF DESCRIPTION OF THE DRAWINGS

FIG. 3 shows an example of a backup management table according to the first embodiment.

FIG. 4 shows an example of a backup schedule table according to the first embodiment.

FIG. 5 shows an example of a differential bitmap according to the first embodiment.

FIG. 6 shows an example of a configuration information table according to the first embodiment.

FIG. 7 shows an example of a media performance table according to the first embodiment.

FIG. 16 shows an example of a backup management table according to the fourth embodiment.

FIG. 20 shows an example of a screen according to the fifth embodiment.

DETAILED DESCRIPTION OF PREFERRED EMBODIMENTS

Embodiments of the present invention will be explained with reference to the attached drawings.

First Embodiment

Figure 1:
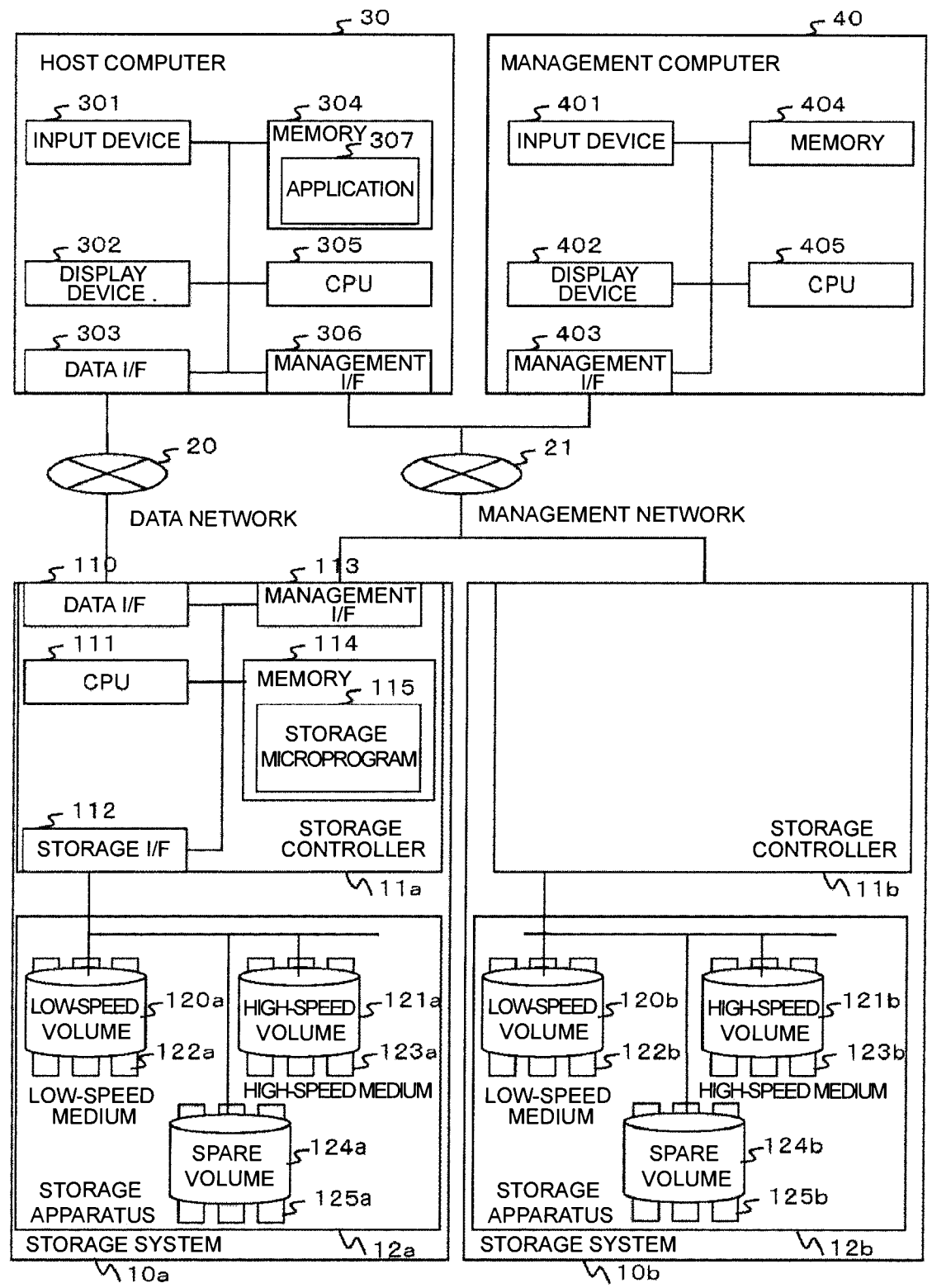
FIG. 1 is a block diagram showing an example of the configuration of a computer system 1 according to the first embodiment.

Firstly, the first embodiment of the present invention will be explained with reference to FIG. 1. FIG. 1 is a block diagram showing the configuration of a computer system 1 according to the first embodiment of the invention.

As shown in FIG. 1, the computer system 1 according to this embodiment is equipped with storage systems 10, a host computer 30, a management computer 40, a data network 20, and a management network 21. The storage systems 10 and the host computer 30 are connected to each other through their respective data interfaces (a data I/F 110 for the storage system 10 and a data I/F 303 for the host computer 30) via the data network 20. In this embodiment, the data network 20 is a SAN (Storage Area Network). However, the data network 20 may be an IP (Internet Protocol) network or other types of data communication networks. The storage systems 10, the host computer 30, and the management computer 40 are connected to each other through their respective management interfaces (a management I/F 113 for the storage system 10, a management I/F 306 for the host computer 30, and a management I/F 403 for the management computer 40) via the management network 21. In this embodiment, the management network 21 is an IP network. However, the management network 21 may be a SAN or other types of data communication networks. Alternatively, the data network 20 and the management network 21 may be the same network. Incidentally, the host computer 30 and the management computer 40 may be configured to use the same computer. The computer system 1 shown in FIG. 1 includes two storage system 10a and 10b, one host computer 30, and one management computer 40; however, there is no limitation on the number of components.

The storage system 10 includes: a storage controller 11 for controlling the entire storage system 10; and a storage apparatus 12 for storing data. The storage controller 11 and the storage apparatus 12 are connected via a storage I/F 112.

The storage controller 11 is equipped with a data I/F 110, a management I/F 113, a CPU (Central Processing Unit) 111, a memory 114, and a storage I/F 112. The data I/F 110 is an interface with the data network 20 for communicating data with the host computer 30 to read/write data from/to the host computer 30 and has one or more communication ports. The storage controller 11 sends/receives data to/from the host computer 30 via the above-mentioned port(s). The CPU 111 is a processor for executing programs stored in the memory 114. The storage I/F 112 in an interface with the storage apparatus 12 and sends/receives data and control commands. The management I/F 113 is an interface with the management network 21 for sending/receiving data and control commands to/from the host computer 30 and the management computer 40 and has one or more communication ports. The storage controller 11 sends/receives data and control commands to/from another storage system 10b via the above-mentioned port(s). The memory 114 stores a storage microprogram 115. The storage microprogram 115 is a program for managing the storage apparatus 12 and executed by the CPU 111 to implement, for example, a function having the host computer 30 recognize volume(s) and a function operating a copy function. Specifically speaking, the function having the host computer 30 recognize volume(s) is a function that provide the host computer 30, via the I/F, volume(s) in the storage apparatus 12 (such as a low-speed volume 120 and a high-speed volume 121 described later) as one or more logical volumes. Also, specifically speaking, the function operating the copy function is a function that copies data in a logical volume to another logical volume. For example, data is copied by setting a volume in the storage apparatus 12a as a PVOL and a volume in the storage apparatus 12b as an SVOL. Incidentally, a unit of data to be copied may be the entire logical volume, or segments constituting a logical volume (hereinafter referred to as "pages"), or blocks.

The storage apparatus 12 is composed of one or more media that are storage areas for storing data operated by a computer (for example, the host computer 30). The media represent storage area resources provided by physical devices such as HDDs (Hard Disk Drives) or SSDs (Solid State Drives). Examples of the types of HDDs include SATA disks and SAS (Serial Attached SCSI) disks. In this embodiment, the hierarchy is configured as shown in FIG. 1 by using, for example, a SATA (Serial Advanced Technology Attachment) disk as a low-speed medium 122 and an SSD as a high-speed medium 123. Writing of differential data during a backup is random writing. In a case of random writing or reading, the SDD demonstrates higher performance than the HDD. Accordingly, it is possible to use the SSD as the high-speed medium and the HDD as the low-speed medium. However, there is no limitation on the types of physical devices. Moreover, the hierarchy may be configured by controlling the number of revolutions of HDDs and adding an HDD, which is made to rotate at a high speed, and an HDD which is made to rotate at a low speed. Furthermore, the hierarchy may be configured with groups of different RAID (Redundant Array of Independent Disks) levels. A volume is a logical storage area composed of a medium/media allocated in advance. The low-speed volume 120 is composed of one or more low-speed media 122 and the high-speed volume 121 is composed of one or more high-speed media 123. The logical volume recognized by the host computer 30 may be a virtual volume. In response to a write request from the host computer 30, a storage area of a medium registered in a pool is allocated to a virtual volume. A plurality of types of media are registered in the pool. In this embodiment, when the storage controller 11 receives a request to write data to a virtual volume and if no medium is allocated to the target area of the write request, a storage area of a medium is allocated to the volume and data is written to the allocated storage area of the medium. As a result, it is possible to make the capacity of the storage area of the volume provided to the host computer 30 larger than the total capacity of the actually allocated medium/media.

Although two volumes (one low-speed volume 120 and one high-speed volume 121) exist in one storage system as shown in the drawing, it is only necessary to have one or more volumes exist.

The storage apparatus 12 includes a spare medium/media 125, which constitutes a spare volume 124. The spare medium/media 125 may be either a high-speed medium/media or a low-speed medium/media. Furthermore, the spare volume 124 may include a plurality of types of media. The spare medium 125 is used as a medium to be added to the pool when a failure occurs or a backup is not completed within the BW.

The host computer 30 sends/receives data via the data I/F 303 to/from the volume 120 of the storage system 10. The host computer 30 is equipped with an input device 301 including a keyboard and a mouse, a display device such as a CRT (Cathode Ray Tube), a data I/F 303, a memory 304, a CPU 305, and a management I/F 306. The data I/F 303 is an interface with the data network 20 and has one or more communication ports. The host computer 30 sends/receives data to/from the storage system 10 via the above-mentioned port(s). The memory 304 stores an application 307, which is executed by the CPU 305. The application 307 is a program for executing processing by reading/writing data from/to the volume 120 in the storage apparatus 12 and is, for example, a DBMS (Data Base Management System) or a file system. For the convenience of explanation, one application 307 is shown in the computer system 1 according to this embodiment shown in FIG. 1, but there is no limitation on the number of the application(s) 307 in this invention. Furthermore, the third embodiment explained later will describe an example of a plurality of applications. The CPU 305 is a processor for executing programs stored in the memory 304. The management I/F 306 is an interface with the management network 21 and sends/receives data and control commands to/from the management computer 40 and the storage systems 10a, 10b for the purpose of system management.

The management computer 40 is a computer for managing the host computer 30 and the storage systems 10a, 10b. The management computer 40 is equipped with an input device 401 including a keyboard and a mouse, a display device 402 such as a CRT, a management I/F 403, a memory 404, and a CPU 405. The management I/F 403 is an interface with the management network 21 and sends/receives data and control commands to/from the host computer 30 and the storage systems 10a, 10b for the purpose of system management. The memory 404 stores programs and information shown in FIG. 2. The memory 404 shown in FIG. 2 stores a backup program 406, a backup time calculation program 407, a backup management table 408, a backup schedule table 409, a differential bitmap 410, a configuration information table 411, and a media performance table 412. The backup program 406 and the backup time calculation program 407 are implemented when executed by the CPU 405, thereby executing the processing according to the embodiment of this invention.

The backup program 406 is a program for providing a setting screen for backups to an administrator, obtaining information from the host computer 30 and the storage systems 10a, 10b, and managing the backup management table 408 and the backup schedule table 409. The backup time calculation program 407 is a program for calculating time it takes to complete a backup based on the information obtained by the backup program 406.

The backup management table 408, the backup schedule table 409, the differential bitmap 410, the configuration information table 411, and the media performance table 412 will be explained later. The CPU 405 is a processor for executing programs stored in the memory 404.

Next, each table to which reference is made in this embodiment will be explained. Although the table format is used in this embodiment, the format in which each piece of information is stored is not limited to the table format. Also, it is unnecessary to store all pieces of information described in the tables. Furthermore, information other than that described in the tables may be included.

FIG. 3 shows an example of the backup management table 408. The backup program 406 executed on the management computer 40 refers to the backup management table 408. The backup management table 408 stores an application ID 4080 for identifying an application which is a backup target, a backup schedule 4081, a BW 4082 indicating a target period of time to complete a backup, a volume ID 4084 of a PVOL storing data of the backup target application, a storage ID 4083 for identifying a storage system to which the above-mentioned volume belongs, a volume ID 4086 of an SVOL storing backup data, and a storage ID 4085 for identifying a storage system to which the above-mentioned volume belongs. The application ID 4080, the schedule 4081, and the BW 4082 are information that is set using the backup program 406 when the administrator backs up an arbitrary application. When the administrator sets the above information, he/she decides a backup schedule and a target time period (BW) required to complete the back with regard to the application to be backed up. The information set by the administrator, that is, the application ID 4080, the schedule 4081, and the BW 4082 are stored by the backup program 406 in the backup management table 408. In the example shown in FIG. 3, the schedule 4081 stores descriptions of a time interval such as "every 30 minutes" and a designated point in time such as "at 22:00 every day"; however, any manner of descriptions may be used for the schedule 4081 as long as backup start time can be specified. As a result of input by the administrator in advance, the management computer 40 has obtained information indicating the relationship between the application 307 and the PVOL 4084 which is the volume 120 storing data to be used by the application 307. This information may be obtained from the host computer 30. Based on the information about the relationship between the application 307 and the PVOL 4084, information about the storage ID 4083 and the volume ID 4084 of the PVOL is stored according to the application ID 4080. The administrator sets the application ID 4080 to the backup program 406, but may set the volume ID 4084 of the PVOL or any other information capable of identifying the volume ID 4084 of the PVOL. Furthermore, the management computer 40 has obtained information about a volume in the state of a copy pair with the volume ID 4084 of the PVOL, from the storage system 10. Based on this information, the storage ID 4085 and the volume ID 4086 of the SVOL in which backup data of the set application is stored are identified and stored in the backup management table 408.

FIG. 4 shows an example of the backup schedule table 409. The backup program 406 executed on the management computer 40 refers to the backup schedule table 409. The backup schedule table 409 stores a backup ID 4090 for uniquely identifying a backup task, an application ID 4091 for identifying an application which is a backup target, a backup start time 4092, a backup completion time 4093, a PVOL 4094 that is a primary volume storing data to be backed up, and an SVOL 4095 that is a secondary volume to which the backup data is to be backed up. The backup start time 4092 is a point in time when data in the PVOL 4094 at that time is to be copied to the SVOL 4095. In this embodiment, a period of time required to read data stored in the PVOL 4095 and write it to the SVOL 4095 is considered to be a period of time it takes to back up the data. However, the backup time may include time required for other processing such as processing necessary to maintain the consistency of the application. A point in time when writing of data to the SVOL 4095 is completed is considered to be the backup completion time 4093. The application ID 4091, the backup start time 4092, the PVOL 4094, and the SVOL 4095 in the backup schedule table 409 are created from the backup management table 408 shown in FIG. 3. Firstly, the relationship between the schedule 4081, the volume ID 4084 of the PVOL, and the volume ID 4086 of the SVOL is confirmed for each application according to the application ID 4080 in the backup management table 408. The point in time when a backup is started is specified from the schedule 4081 and then stored in the backup start time 4092 for the backup schedule 409. The number of generations is recognized based on the volume ID 4084 of the PVOL and the volume ID 4086 of the SVOL and then the PVOL 4094 and the SVOL 4095 are stored in the backup schedule table 409. The backup completion time 4093 stores time when the backup program 406 completes the backup. If the backup is not completed, the backup completion time 4093 field is left blank. As shown in FIG. 4, the mark "—" may be stored in the backup completion time 4093 and there is no particular limitation on the content of description as long as the description shows there is no completion time.

FIG. 5 shows an example of the differential bitmap 410. The differential bitmap 410 is a table for managing the volumes 120 whose data is updated based on writing by the host computer 30. In the split operation, data in the PVOL is copied to the SVOL at certain timing (full backup) and after that, update data to the PVOL (differential data) is managed. Then, the differential data is copied from the PVOL to the SVOL at specified timing.

The differential bitmap 410 exists for each copy pair of the volumes 120 used for a backup. For example, regarding the backup management table 408 shown in FIG. 3, one differential bitmap 410 exists for a pair of the PVOL volume ID 4084 "VOL001" and the SVOL volume ID 4086 "VOL002"; and similarly, one differential bitmap 410 exists for a pair of "VOL001" and "VOL003" and one differential bitmap 410 exists for a pair of "VOL001" and "VOL004." The differential bitmap 410 stores a volume LBA (Logical Block Address) 4100 for identifying each block in the PVOL and SVOL, and an update flag 4101 for identifying whether the relevant block is updated or not. A "block" is an area defined by a logical address. If the block is updated, the update flag 4101 is set to "1"; and if the block is not updated, the update flag 4101 is set to "0." Any mark other than "0" or "1" may be set to the update flag as long as it shows the relevant block is updated or not. If the update flag 4101 in the differential bitmap 410 indicates that the state of the PVOL and the state of the SVOL are completely the same, all the relevant fields are set to "0" (no update). For example, if data of the PVOL is completely identical to that of the SVOL after a backup, the update flag is set to "0." If data is updated as a result of data writing by the host computer 30, the update flag 4101 for the relevant volume LBA 4100 is set to "1." It is possible to judge which volume LBA 4100 has been updated or not, by referring to the differential bitmap 410. Therefore, in a case of a difference backup, it is only necessary to copy data of the PVOL at the volume LBA 4100, whose update flag 4101 is "1," to the SVOL.

FIG. 6 shows an example of the configuration information table 411. The configuration information table 411 is a table for storing configuration information about the storage system 10, and the backup program 406 and the backup time calculation program 407 executed on the management computer 40 refer to this configuration information table 411. The configuration information table 411 stores a storage ID 4110 for identifying the storage system 10, a pool ID 4111 for identifying a pool in which the media 122, 123 are put together and registered in the storage system 10, a medium ID 4112 for identifying the relevant medium 122, 123 which is a physical resource, a medium type 4113 indicating the type of the physical resource, a medium LBA area 4114 for identifying a medium storage area allocated to each page, a page ID 4115 for identifying the relevant segment of the medium 122, 123, the capacity 4116 of the relevant page, a volume ID 4117 for identifying a virtual volume to which the relevant page is allocated, and a volume LBA area 4118 for identifying a storage area of the virtual volume which corresponds to the relevant page. In the example shown in FIG. 6, the medium type 4113 column stores a "high-speed medium," a "medium-speed medium," or a "low-speed medium" for the sake of convenience; however, there is no particular limitation on how to express the relevant medium such as a physical disk, an SSD, a logical device (LDEV), or a disk of an external device as long as a unique storage area can be identified. Also, the capacity 4116 stores a fixed value of 10 MB as the page capacity; however, there is no particular limitation on the page capacity and the capacity is calculated and stored based on the capacity of one block and the medium LBA area. The volume ID 4117 and volume LBA area 4118 columns display "N/A" when no page is allocated to the virtual volume; however, any other expressions may be used as long as such other expressions can indicate that no page is allocated to the virtual volume. The configuration information table 411 is obtained from the storage systems 10a, 10b. The storage ID 4110, the pool ID 4111, the medium ID 4112, and the medium type 4113 are decided when a medium is added to the storage system 10. The medium LBA area 4114, the page ID 4115, and the capacity 4116 are decided when the medium is turned into a set(s) of multiple LBAs and thereby divided into page units. The volume ID 4117 and the volume LBA area 4118 are decided when data is written from the host computer 30 and a request is made by the host computer 30 to allocate a page to the virtual volume. The relationship between the page ID 4115 and the volume LBA area 4118 changes every time page allocation is changed occurs due to the access frequency, page allocation, and page relocation.

FIG. 7 shows an example of the media performance table 412. The media performance table 412 is a table for storing performance information about the media 122, 123 on the storage apparatus 12 for the storage system 10. The media performance table 412 stores a medium type 4120 indicating the type of physical resources, Random Read performance 4121 indicating a speed at which data is randomly read from the media 122, 123, and Random Write performance 4122 indicating a speed at which data is randomly written to the media 122, 123. Like the medium type 4113 in the configuration information table 410 shown in FIG. 6, the medium type 4120 stores a "high-speed medium," a "medium-speed medium," and a "low-speed medium"; however, there is no particular limitation on how to express the medium type as long as a unique storage area can be identified. However, the expressions that can associate the medium type 4120 in the media performance table 412 with the medium type 4113 in the configuration information table 410 should be used. The Random Read performance 4121 and the Random Write performance 4122 may store actual measured values obtained by the storage system 10 by measuring the performance of each medium, or the backup program may have catalogue specification information about the media 122, 123 in advance, or the administrator may input the Random Read performance 4121 and the Random Write performance 4122.

Next, backup processing according to this embodiment will be explained with reference to FIG. 8. This processing makes it possible to reduce the backup time.

Units herein used for controlling differential data may be blocks or pages, each of which consists of a plurality of blocks. This embodiment will describe a case where the differential data is controlled on a page basis. The second embodiment will describe a case where the differential data is controlled on a block basis. FIG. 8 shows the environment where the differential data is controlled on a page basis among a plurality of types of media.

Figure 8:
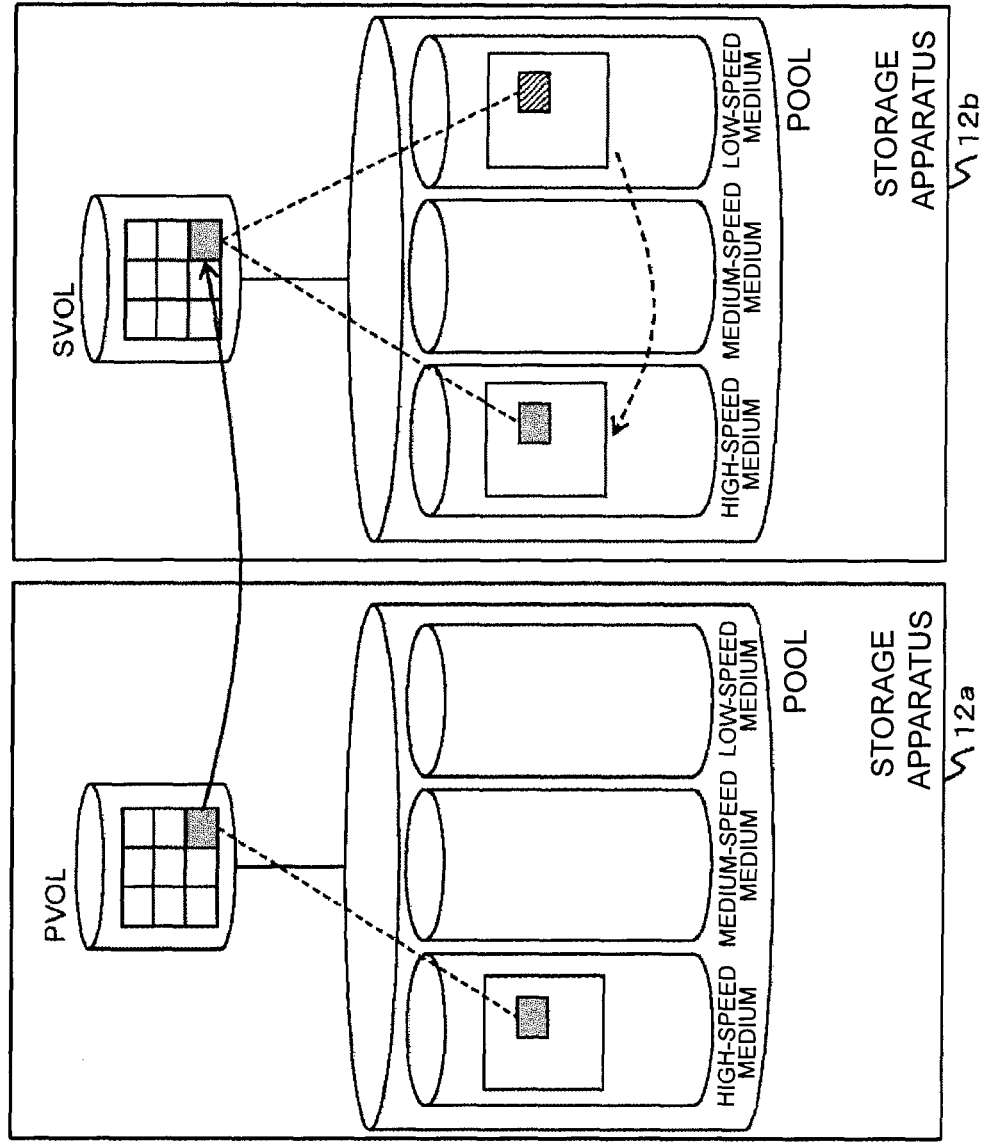
FIG. 8 shows an example of a conceptual diagram according to the first embodiment.

In the environment shown in FIG. 8, the PVOL and the SVOL are virtual volumes. In this environment, the media registered in a pool are allocated on a page basis to the virtual volumes in response to a write request from the host computer 30. Furthermore, in this environment, pages can be dynamically controlled and migrated between a plurality of media. Page migration herein means copying a page from a medium to another medium and deleting the page stored in the source medium. The medium to which the differential data is to be written can be identified based on the differential bitmap 410 and the configuration information. FIG. 8 shows differential data as a shaded region with dots and the location where the differential data is to be written, as a shaded region with diagonal strokes. If the differential data is to be written to a page stored in the low-speed medium of the SVOL, a backup may not be completed within the BW. In this case, the page is controlled so that the differential data to be written to the low-speed medium of the SVOL will be written to the high-speed medium. Specifically speaking, since a page can be dynamically migrated between the plurality of types of media in this environment, the page to which the differential data is to be written is migrated to the high-speed medium before stating a backup. Consequently, the differential data will be written not to the low-speed medium, but to the high-speed medium, so that the backup time can be reduced. The high-speed medium can be used efficiently by migrating the page, to which the differential data has been written, to the low-speed medium after the completion of the backup. In this environment, processing for migrating the page to the high-speed medium may be executed at the time of periodical page relocation processing. The page may be migrated at another timing.

Next, a data processing sequence according to this embodiment will be explained.

Figure 9:
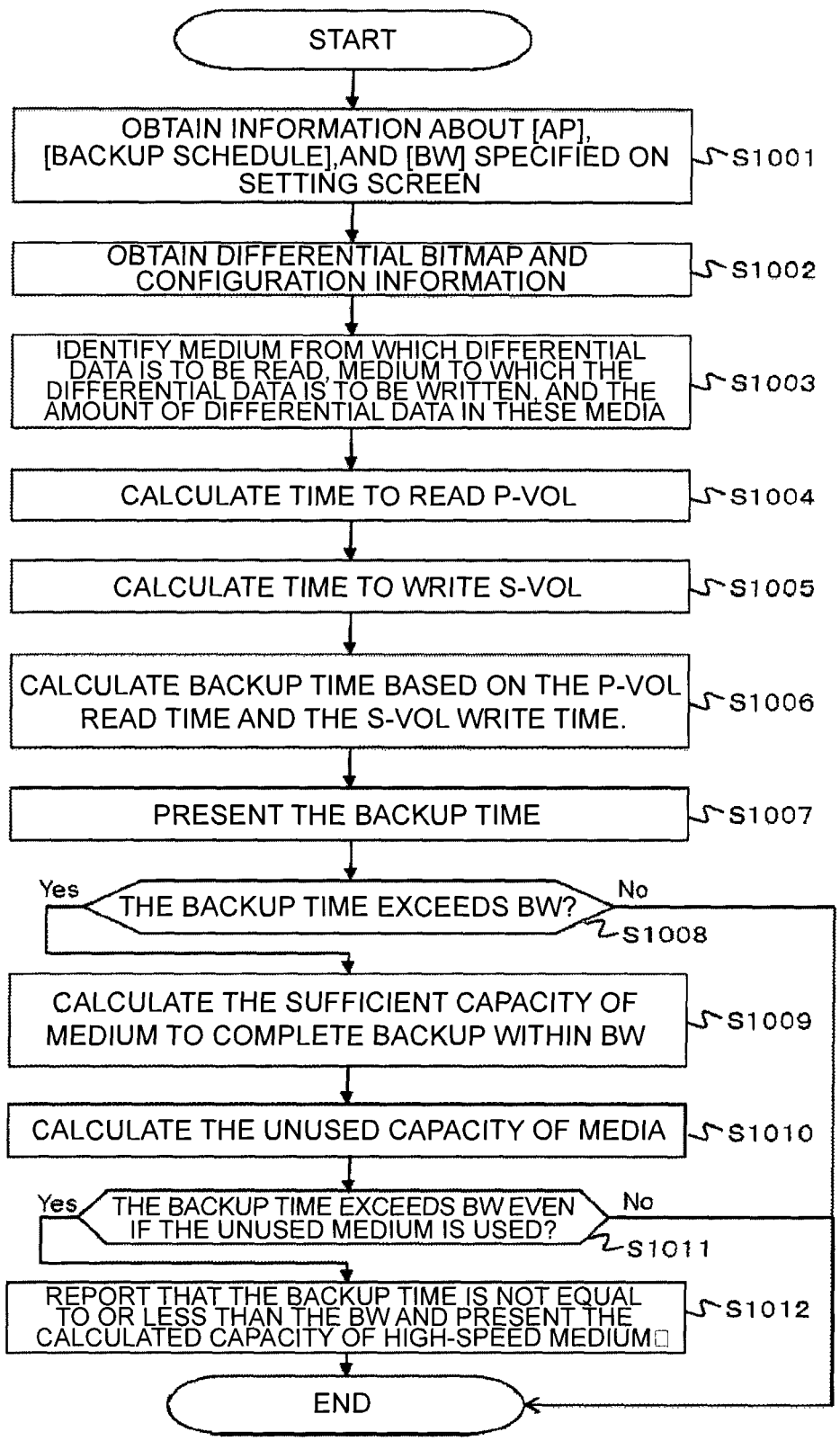
FIG. 9 shows an example of BW and media management processing according to the first embodiment.

Firstly, time it takes to complete a backup is calculated and the sufficient medium capacity to complete the backup within the BW is calculated, thereby presenting the calculated backup time and medium capacity. This is implemented by a processing sequence for managing the BW and media as shown in FIG. 9. Furthermore, after adding a high-speed medium to the pool in order to decrease the backup speed and when copying the differential data, the data is written to the high-speed medium which has been added to the pool. This was explained earlier with reference to the conceptual diagram shown in FIG. 8. Also, a command is given to copy the copied data to the low-speed medium after the completion of copying in order to use the high-speed medium again for the next backup. The above-described processing is implemented by a differential data migration control processing sequence shown in FIG. 11.

In addition, if a failure occurs in the PVOL during the operation of the application, the SVOL storing the backup data may sometimes be used. In this case, the SVOL is used by copying the data in the SVOL to a high-speed medium stored in a cache pool in order to enhance the performance of the SVOL. This processing is implemented by an SVOL use processing sequence shown in FIG. 13.

BW and Media Management Processing

Next, processing for calculating time it takes to complete a backup according to this embodiment, calculating the medium capacity necessary to complete the backup within the BW, and presenting the calculated backup time and capacity will be explained. The backup may not be completed depending on the amount of differential data. In this case, it is necessary to add a high-speed medium or a medium-speed medium to the pool in order to complete the backup within the BW. Therefore, the minimum medium capacity necessary to complete the backup within the BW is calculated by this processing.

FIG. 9 shows an example of the BW and media management processing sequence.

Processing in step S1001 to step S1012 in FIG. 9 is implemented by the backup program 406 on the management computer 40 according to this embodiment. However, the above processing include processing executed by the backup time calculation program 407 in response to a command issued by the backup program. Although described later with respect to the second embodiment, the location where the backup program 406 and the backup time calculation program 407 are stored is not limited to the management computer 40, and they may be stored in the memory 114 for the storage system 10. A command to the storage apparatus 12 may be given by the storage microprogram 115. In any event, specifically which processing step is implemented by which program may be decided as appropriate according to, for example, a request relating to system designing. The above-described processing steps are implemented by the CPU by reading each program from the memory and executing the processing steps. A program may sometimes be mentioned as the subject of the relevant sentence in the following explanation, but actually the CPU which is a processing unit for executing the relevant program executes the processing.

Firstly, after receiving a backup request from the administrator, the backup program 406 displays a backup setting screen and starts the processing. Incidentally, the screen may be implemented by graphic screen operation such as a GUI (Graphical User Interface) or command input such as a CLI (Command Line Interface).

In S1001, the backup program 406 in the memory 404 for the management computer 40 obtains information about an application, which is a backup target and input by the administrator to the backup setting screen, a backup schedule indicating a time interval or a date and time for obtaining the backup data, and the BW indicating a target time to complete the backup. These pieces of information are stored in the application ID 4080, the schedule 4081, and the BW 4082 in the backup management table 408, respectively. The administrator may input and designate not the application which is the backup target, but a volume which stores data to be used by the application. In this case, information about the volume is stored in the PVOL storage ID 4083 and the PVOL volume ID 4084 in the backup management table 408.

In S1002, the backup program 406 obtains the differential bitmap 410 information and configuration information that the storage system has. The configuration information is obtained from the storage systems 10a, 10b. After the acquisition of the configuration information, this information is stored in the configuration information table 411 in the management computer 40. The differential bitmap for a copy pair of a PVOL and an SVOL for which copying will be executed next time is obtained from the storage system 10a to which the volume (P-VOL) storing data to be used by the application, which is the backup target, belongs. The storage system from which the differential bitmap is obtained is specified by referring to the storage ID 4083 in the backup management table 408 in order to calculate time it takes to back up the application which is the backup target.

In S1003, the backup program 406 specifies a medium from which the differential data is to be read, a medium to which the differential data is to be written, and the amount of differential data in each of these media based on the differential bitmap 410 obtained in S1002. The differential bitmap at the time of the previous backup may be used in order to predict the amount of differential data to be copied. Also, the amount of differential data to be backed up may be predicted according to an increase rate of the amount of differential data, using the differential bitmap 410. Firstly, the medium to which the differential data is to be written is identified based on the differential bitmap 410 and the configuration information table 411. This means that the differential bitmap 410 is searched for the volume LBA 4100 whose update flag 4101 is set to "1." The search is conducted to find in which range of the volume LBA area 4118 in the configuration information table 411 the relevant volume LBA 4100 exists. Furthermore, the search is conducted to find to which page ID 4115 or medium LBA area 4114 this volume LBA area 4118 is allocated, and find which medium ID 4112 and medium type 4113 are used. For example, the medium from which the differential data is to be read, and the amount of differential data are specified. Assuming that FIG. 5 shows the differential bitmap 410 for the volume IDs "VOL001" and "VOL002," the volume LBA 4100 whose update flag 4101 is set to "1" is "LBA0000." The configuration information table 411 shows that the above-mentioned volume LBA is within the range of the volume LBA area 4118 "LBA0000-0999" whose volume ID 4117 is "VOL001." This volume LBA area 4118 can be identified as having the page ID 4115 "Page001," the medium LBA area 4114 "LBA0000-0999," the medium ID 4112 "Medium 001," and the medium type 4113 "high-speed medium." Also, the configuration information table 411 shows that the volume LBA 4100 "0001" shown in the differential bitmap 410 in FIG. 5 is a low-speed medium for "VOL2." The amount of differential data can be calculated from the number of the volume LBAs 4100 whose the update flags 4101 are set to "1" in the differential bitmap 410. For example, the capacity of a block indicated by one volume LBA 4110 is 512 Bytes. However, the capacity of a block is not limited to this capacity. If one hundred blocks whose update flags 4101 are set to "1" exist, the amount of differential data can be calculated to be 51200 Bytes. This result is used to calculate the amount of differential data for each medium type 4113.

In S1004, the backup time calculation program 407 in the memory 404 for the management computer 40 calculates time it takes to read the differential data from the PVOL. The backup time calculation program 407 searches for the medium type 4120 in the media performance table 412 shown in FIG. 7 according to the medium type on the PVOL side as specified in S1003 and then obtains the Random Read performance 4121. Time it takes to read the differential data is calculated from the read performance and the amount of differential data for the relevant medium as calculated in S1003. The same calculation is performed for other media to calculate time it takes to read all the pieces of differential data. In this embodiment, the media performance table 412 is created on the management computer 40 in advance based on the catalogue specification information or by the administrator's input. However, the storage systems 10a, 10b may have information about actual measured values of the performance of the respective media, so that the information may be obtained from the storage systems 10a, 10b in S1002 or before this step.

In S1005, the backup time calculation program 407 calculates time it takes to write the differential data to the SVOL. This is done in the same manner as in S1004 by searching for the medium type of the SVOL from the medium type 4120 in the media performance table 412 in FIG. 7 and obtaining the Random Write performance 4122. Time it takes to write all the pieces of differential data is calculated from this write performance and the amount of differential data calculated in S1003.

In S1006, the backup time calculation program 407 calculates time it takes to back up the data from the time it takes to read the differential data from the PVOL as calculated in S1005 and the time it takes to write the differential data to the SVOL as calculated in S1006.

However, If the differential data is stored in the high-speed medium of the PVOL, the backup time may be decided based on only the time it takes to write the differential data to the SVOL without considering the time it takes to read the differential data. In this case, steps S1004 and S1006 are not performed.

In S1007, the backup program 406 presents the backup time calculated in S1006 to the administrator. Steps S1001 to S1006 may be repeated at certain intervals, thereby presenting the backup time to the administrator. Furthermore, processing from S1001 to 1006 may be performed when the administrator gives a command to do so, or when a medium is added to the pool, or when the BW or the backup schedule is changed. Any means of presenting the backup time, other than the screen, may be used as long as the administrator is notified of the backup time. Also, this step may be omitted.

In S1008, the backup program 406 compares the BW input by the administrator in S1001 with the backup time calculated in S1006. When the backup time is calculated in S1006, the backup program 406 refers to the value of the BW 4082 in the backup management table 408 and checks if the backup time exceeds the BW or not. If the backup time exceeds the BW, the processing proceeds to S1009; and if the backup time does not exceed the BW, this processing terminates.

In S1009, the backup time calculation program 407 calculates the sufficient capacity of the high-speed medium to complete the backup within the BW. This is done to reduce the backup time by using the high-speed medium from the media performance table 412, rather than the low-speed medium which has been used.

An example of a method for calculating the capacity of the high-speed medium necessary to complete the backup within the BW will be explained with reference to FIG. 18.

Figure 18:
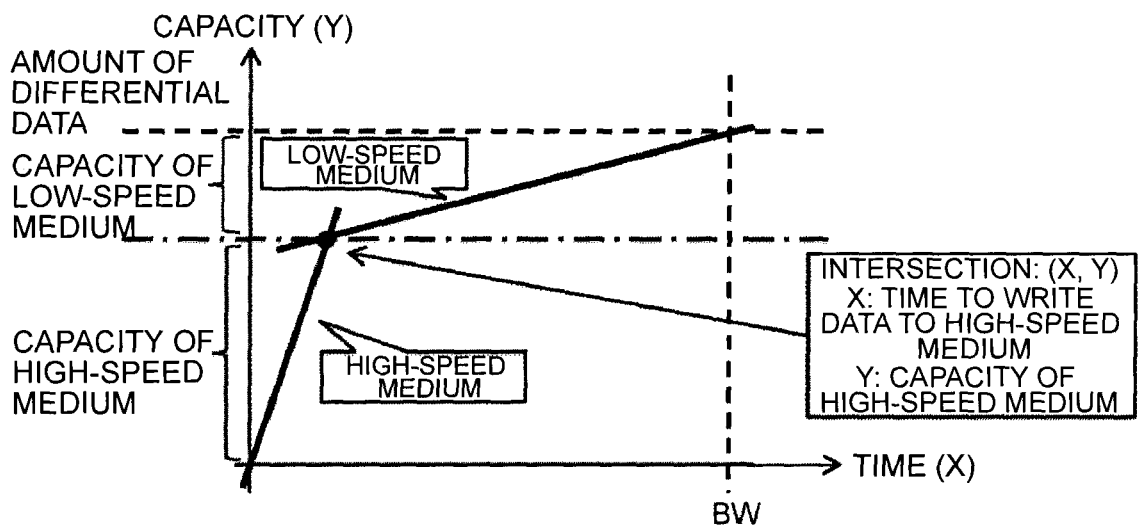
FIG. 18 shows an example of a method for calculating the capacity of media according to the first embodiment.

In the graph shown in FIG. 18, the vertical axis indicates the capacity and the horizontal axis indicates time. The slope of a straight line representing the high-speed medium indicates the write performance of the high-speed medium. In other words, the slope is calculated by "capacity/time" and indicates the capacity of data that can be written per unit time. Similarly, the slope of a straight line representing the low-speed medium indicates the write performance of the low-speed medium. The above-mentioned performance is specified by referring to FIG. 7. As shown in FIG. 18, the straight lines are drawn so that the backup of a specified amount of differential data will be completed within the BW, using the high-speed medium and the low-speed medium. The capacity of the high-speed medium necessary to complete the backup within the BW is found according to an intersection of these two straight lines. This intersection is calculated as described below.

A formula representing the high-speed medium is "y=[performance of the high-speed medium]*x" (Formula 1), while a formula representing the low-speed medium is "y=[performance of the low-speed medium]*x+α" (Formula 2). Since the straight line represented by Formula 2 passes through the intersection of the BW with the amount of differential data, Formula 2 changes to "y=[performance of the low-speed medium]*x+[the amount of differential data]−[performance of the low-speed medium]*[BW]."

Accordingly, the capacity of the high-speed medium is obtained by the following formula: [capacity of the high-speed medium]=([performance of the high-speed medium]*[amount of differential data]−[performance of the high-speed medium]*[performance of the low-speed medium]*[BW])/ ([performance of the high-speed medium]−[performance of the low-speed medium]). The "low-speed medium" in the above formula indicates a medium which has been used, while the "high-speed medium" indicates a medium which demonstrates a faster speed than that of the "low-speed medium." However, the formula to obtain the capacity of the high-speed medium is not limited to the above-mentioned formula.

As a result of this processing, the minimum medium capacity necessary to complete the backup within the BW can be calculated.

In S1010, the backup program 406 calculate the unused capacity of media existing in the pool. The backup program 406 specifies unused media belonging to the pool according to the pool ID 4111 in the configuration information table 411 and calculates the capacity of unallocated media according to the volume ID 4117 and from the capacity 4116. For example, a medium whose pool ID 4111 is "Cpool001" and volume ID is "N/A" is an unused medium. In this example, 50 MB of the "high-speed medium" and 50 MB of the "medium-speed medium" exist.

In S1011, the backup program 406 judges whether the backup will be completed within the BW by using an unused medium/media. In other words, if the unused medium capacity calculated in S1010 is equal to or more than the capacity calculated in S1009, the backup program 406 determines that the backup will be completed within the BW. If the backup time exceeds the BW, the processing proceeds to S1012; and if the backup time is equal to or less than the BW, this processing terminates.

Figure 10:
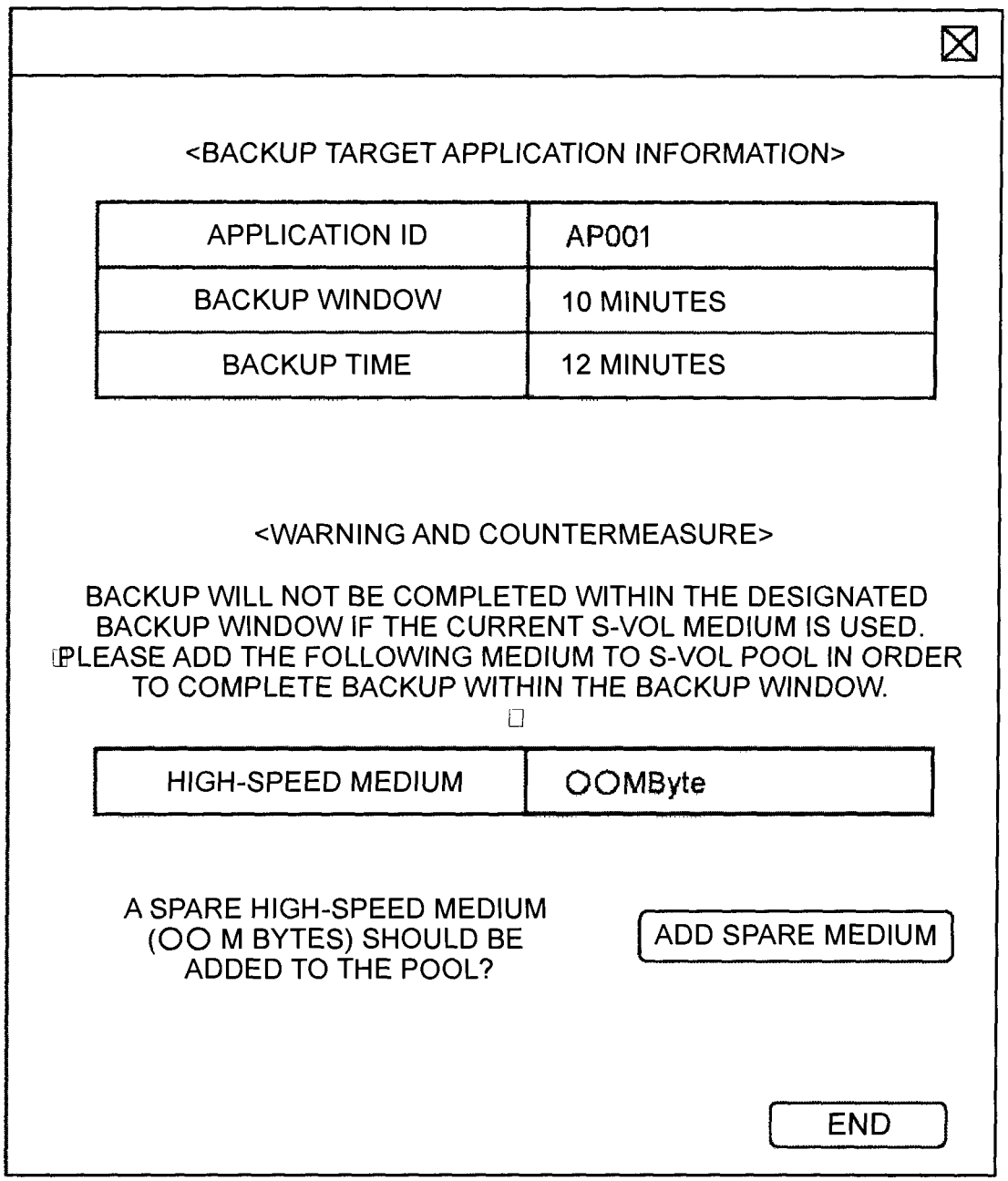
FIG. 10 shows an example of a screen according to the first embodiment.

In S1012, the backup program 406 reports to the administrator that the backup will not be completed within the BW; and presents the capacity of difference between the capacity of the high-speed medium already belonging in the pool and the capacity of the high-speed medium calculated in S1009. For example, a screen as shown in FIG. 10 is displayed on the display device 402 for the management computer 40. The screen may be displayed on the display device 302 for the host computer 30. FIG. 10 shows the screen composed of a backup target application information column, a warning and countermeasure column, a spare medium addition button, and an end button. The backup target application information column displays, for example, information for identifying the application such as the application ID, the BW designated by the administrator, and the backup time calculated in S1006. The warning and countermeasure column displays: a warning to indicate that the backup time is not equal to or less than the BW designated by the administrator; and a notice to prompt the administrator to add the sufficient medium calculated in S1009 to the pool to complete the backup within the BW. However, the means of notification is not limited to the notice shown in FIG. 10. The notice may be given not on the screen as shown in FIG. 10, but by e-mail.

If the storage apparatus 12 has a spare medium when adding a medium to the pool, this spare medium can be used. For example, the medium having the necessary capacity can be added to the pool when the spare medium addition button as shown in FIG. 10 is pressed. Alternatively, the setting may be made so that the spare medium will be automatically added to the pool. Also, the administrator may physically add a new medium to the storage apparatus 12.

If the administrator determines, based on the backup time and the necessary medium capacity to be added, that the backup time may exceed the backup window, the backup is performed without adding a medium. In this case, when the end button is pressed, the backup is performed without adding a medium to the pool.

Differential Data Migration Control Processing

Figure 11:
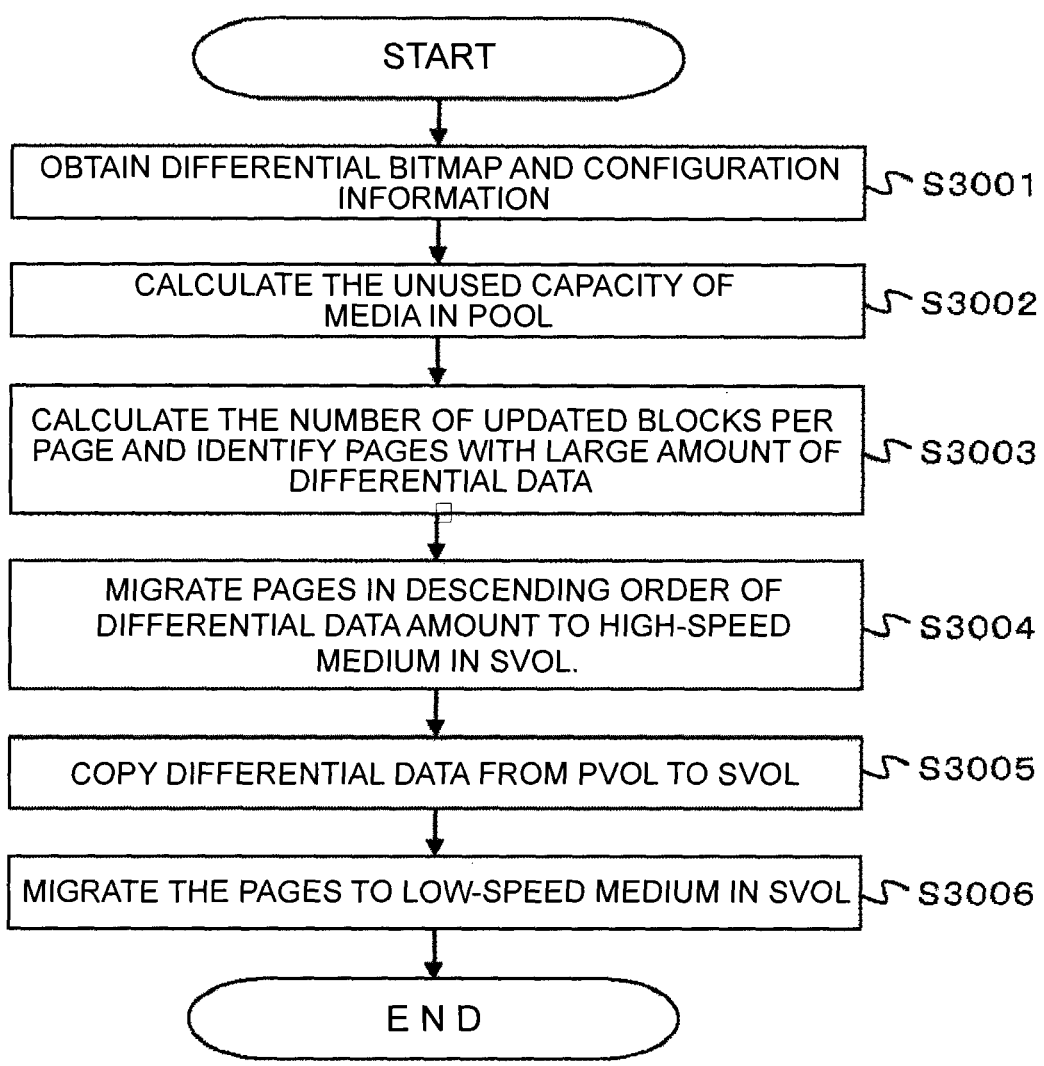
FIG. 11 shows an example of differential data migration control according to the first embodiment.

Next, processing for controlling a copy destination of differential data according to this embodiment will be explained. In this environment where both the high-speed media and the low-speed media exist, a medium to which the differential data is copied is controlled so as to decrease the backup speed. FIG. 11 shows an example of differential data migration control processing. FIG. 11 shows the processing executed in the environment where the differential data is controlled on a page basis as shown in FIG. 8. It is possible in this environment to dynamically migrate a page between the plurality of types of media, so that a page to which the differential data is to be written is migrated to a high-speed medium before starting the backup and the differential data is then written to that page. In other words, the page to be allocated to the virtual volume changes from the low-speed medium to the high-speed medium. As a result, in terms of a page unit, the same effect can be obtained as in the case where data writing to the SVOL is completed. Also, in order to use the high-speed medium again for the next backup, this processing includes a processing sequence for giving a command to copy the differential data, which has been copied to the high-speed medium, to the low-speed medium.

Processing from step S3001 to step S3006 shown in FIG. 11 is implemented by the backup program 406 in the memory 404 for the management computer 40 according to this embodiment. However, the processing includes processing executed by the storage microprogram 115 in the memory 114 for the storage system 10a, 10b. Regarding this processing like the case mentioned earlier, the location where the backup program 406 is stored is not limited to the management computer 40, but the backup program 406 may be stored in the memory 114 for the storage system 10 and a command to the storage apparatus 12 may be given by the storage microprogram 115. In any event, specifically which processing step is implemented by which program may be decided as appropriate according to, for example, a request relating to system designing.

FIG. 11 shows processing for performing a backup by controlling storage areas on a page basis.

In S3001, the backup program 406 in the memory 404 for the management computer 40 obtains the differential bitmap 410 information and configuration information that the storage systems 10a, 10b have. This processing is the same as the processing in S1002. However, if the management computer 40 has the latest information, this step may not necessarily be performed.

In S3002, the backup program 406 calculates the unused capacity of a medium/media in the pool. The backup program 406 identifies a medium belonging to the cache pool according to the pool ID 4111 in the configuration information table 411 and calculates the capacity of an unallocated medium according to the volume ID 4117 and from the capacity 4116. For example, in FIG. 6, "C" is added to the top of the pool ID 4111 of a cache pool to distinguish the cache pool. The cache pool can be identified as a pool having the pool ID 4111 "CPool001." FIG. 6 shows that this pool stores media whose medium IDs 4112 are "Medium 004," "Medium 005," and "Medium 006" and whose medium types 4113 are a "high-speed medium," a "medium-speed medium," and a "low-speed medium." The backup program 406 searches for media, whose volume IDs 4117 are "N/A," and then calculates the total capacity of such media.

In S3003, the backup program 406 searches the differential bitmap 410 and the configuration information table 411, calculates the number of updated blocks per page, and identifies a page with a large amount of differential data. For example, the backup program 406 counts the number of the volume LBAs whose update flags in the differential bitmap 410 in FIG. 5 are set to "1." When doing so, the backup program 406 counts the number of "1" in the update flag 4101 for each page ID 4115 in association with the volume LBA area 4118 in the configuration information table 411. Then, the backup program 406 sorts the page in descending order of the number of "1," that is, in descending order of the amount of differential data. The reason why the amount of differential data per page is calculated is to reduce the backup time as much as possible. Specifically speaking, the pages are backed up in descending order of the amount of differential data by using the high-speed medium, so that the high-speed medium can be utilized more efficiently. However, the processing in this step may not necessarily be performed.

In S3004, a command is given to migrate the relevant page(s) in the SVOL from the low-speed medium to the high-speed medium before starting the backup. This processing is the processing for migrating the page(s) from the low-speed medium to the high-speed medium in the pool in the conceptual diagram shown in FIG. 8. Specifically speaking, the backup program 406 checks the backup start time 4092 in the backup schedule 409. Before starting this backup, the backup program 406 gives a command to the storage microprogram 115 for the storage system 10 to migrate the relevant page(s) in the SVOL to the high-speed medium in the pool. When step S3003 is performed, the command is given to migrate the page(s) in descending order of the amount of differential data to the high-speed medium. When this command is given, the storage microprogram 115 migrates the page(s), to which the differential data in the SVOL is to be written, to the high-speed medium. In the case of this processing, only the relationship between the volume LBA area 4118 and the page ID 4115 in the configuration information table 411 changes. In other words, the differential data is directly copied from the PVOL to the SVOL, regardless of whether the differential data is copied to the high-speed medium or the low-speed medium.

In S3005, the differential data is copied from the PVOL to the SVOL. Specifically speaking, the backup program 406 refers to the backup start time in the backup schedule and gives a command to the storage microprogram 115 to copy the differential data. The storage microprogram 115 refers to the differential bitmap 410 and executes copying. As a result of the completion of copying from the PVOL to the SVOL, the backup of the application data is completed; and the backup program 406 writes information to the backup completion time 4093 in the backup schedule table 409.

In S3006, the page(s) written to the high-speed medium in S3005 is/are migrated to the low-speed medium. Specifically speaking, the backup program 406 gives a command to the storage microprogram 115 to migrate the relevant page(s). When this processing is executed, the page(s) in the storage area(s) in the high-speed medium to which the differential data is written is/are deleted after the completion of copying from the high-speed medium to the low-speed medium. This processing is to make the high-speed medium available after the completion of copying the data from the PVOL to the high-speed medium constituting the SVOL. As a result, the high-speed medium can be used efficiently. In other words, the high-speed medium can be also used for a backup using another application. After the pages are migrated to the low-speed medium, this processing terminates. However, this step may not be performed because the pages can be dynamically migrated between the plurality of types of media according to the access frequency, so that even if the command of this step is not issued, and if the pages are not accessed, they are automatically migrated to the low-speed medium.

SVOL Use Processing

Next, processing for using the SVOL in which the backup data is stored according to this embodiment will be explained.

The administrator uses the SVOL when, for example, a failure occurs in the PVOL. When this happens, the SVOL is used as a substitute for the PVOL. However, since the SVOL is normally accessed less frequently, data are often stored in the low-speed medium. Also, pages might have been migrated to the low-speed medium as a result of the aforementioned processing in S3006. So, there is a problem of the SVOL's inability to demonstrate the same performance as that of the PVOL when the administrator starts using the SVOL. Therefore, in the environment where both the high-speed medium and the low-speed medium exist according to this embodiment, the configuration information table 411 information is obtained together with the application data at the time of a backup. When a failure in the PVOL is detected, the placement of data stored in the SVOL media is changed to the same data placement as that of the PVOL based on the configuration information table 411 information, so that the performance of the SVOL can be immediately improved. Consequently, it is possible to prevent degradation of the performance when starting using the SVOL as a substitute for the PVOL at the time of the occurrence of a failure.

Figure 12:
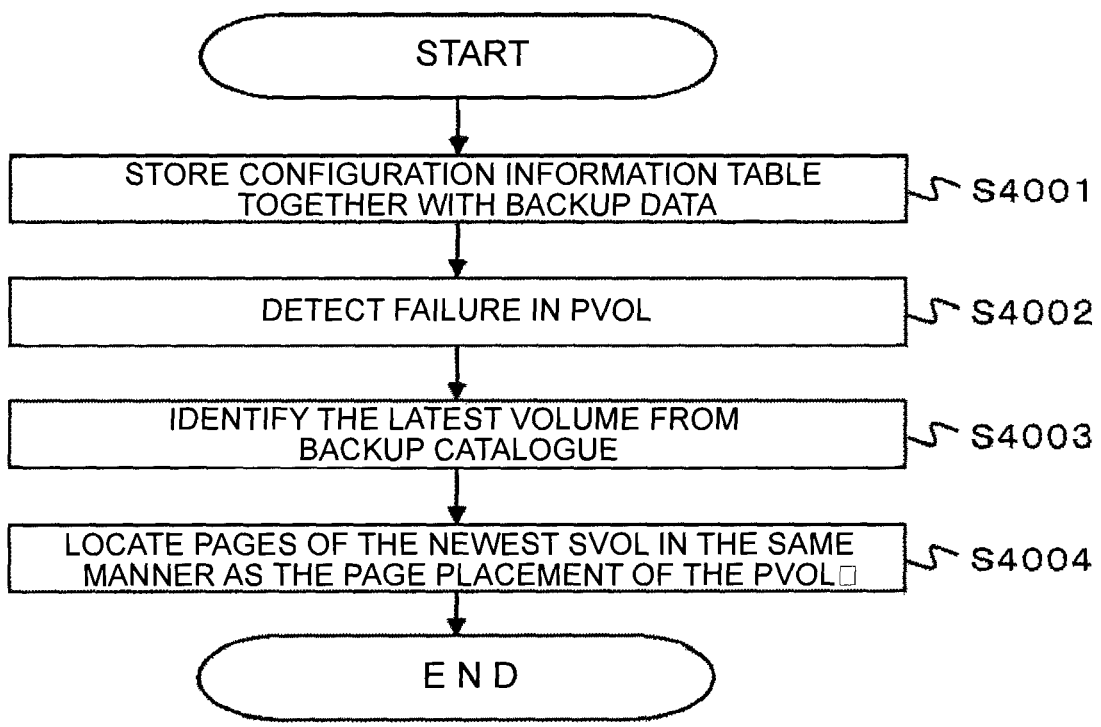
FIG. 12 shows an example of SVOL use processing according to the first embodiment.

Processing in step S4001 to step S4004 in FIG. 12 is implemented by the backup program 406 in the memory 404 for the management computer 40 according to this embodiment. However, the above processing include processing executed by the storage microprogram 115 in the memory 114 for the storage system 10a, 10b in accordance with a command from the backup program 406. Regarding this processing like the case mentioned earlier, the location where the backup program 406 is stored is not limited to the management computer 40, and it may be stored in the memory 114 for the storage system 10. A command to the storage apparatus 12 may be given by the storage microprogram 115. In any event, specifically which processing step is implemented by which program may be decided as appropriate according to, for example, a request relating to system designing.

FIG. 12 shows an example of the SVOL use processing.

In S4001, the backup program 406 in the memory 404 for the management computer 40 copies the configuration information table 411 together with the backup data at the time of the backup of the application data.

In S4002, the backup program 406 detects a failure in the PVOL. The backup program 406 may have a function detecting a failure or receive a failure notice from the storage system or from another program; and any means of notice acquisition may be used as long as the backup program 406 can detect a failure in the PVOL.

In S4003, the backup program 406 identifies the latest SVOL from the backup schedule table 409. For example, assuming that a failure in the volume "VOL001" in which "AP001" data is stored is detected in S4003, the backup program 406 refers to the backup completion time 4093 in the backup schedule 409 in FIG. 4 and searches for the latest time. In the case of FIG. 4, the backup program 406 finds that the backup completion time 4093 is "at 12:45 on 2009/12/1" and identifies the SVOL 4095 "VOL002" storing the latest data.

In S4004, the backup program 406 checks the medium type 4113 of the PVOL according to the volume ID 4117 in the configuration information table 411 and locate the SVOL identified in S4003 in the same media placement as that of the PVOL. Specifically speaking, the backup program 406 gives a command to the storage microprogram 115 in the memory 114 for the storage system 10 to execute the placement. For example, assuming that the configuration information table 411 shown in FIG. 6 is the configuration information table 411 at "22:30 on 2009/12/1" when a backup of the application is obtained, the backup program 406 searches the volume ID 4117 in the configuration information table 411 for the placement of the PVOL 4094 "VOL001" and specifies the medium type 4113 for each page, for example, the "high-speed medium" for "Page001" and "Page002" and the "medium-speed medium" for "Page011." Next, the backup program 406 searches the volume ID 4117 in the configuration information table 411 for "VOL002" identified in S4003, associates the volume LBA area 4118 for the PVOL with the volume LBA area 4118 for the SVOL, the storage microprogram 115 applies the page placement of the PVOL to the SVOL. However, if the medium capacity of the PVOL is different from that of the SVOL and the same placement as that of the PVOL cannot be applied to the SVOL, the PVOL and the SVOL may be migrated to media having the same level of performance. This processing terminates after the data migration.

Second Embodiment

Next, the second embodiment will be explained.

The difference between this embodiment and the first embodiment is that copying of differential data is controlled on a block basis in this embodiment. The difference from the first embodiment will be explained below with regard to differential data copy processing.

The configuration of the computer system 1 and the information stored in the memory 404 for the management computer 40 are the same as those in the first embodiment. The page ID 4115 and the capacity 4116 in the configuration information table 411 may be omitted.

Backup processing according to this embodiment will be explained below with reference to FIG. 13.

In this embodiment, the PVOL and the SVOL may not be virtual volumes. FIG. 13 illustrates that the SVOL is composed of a medium not included in a cache pool.

Figure 13:
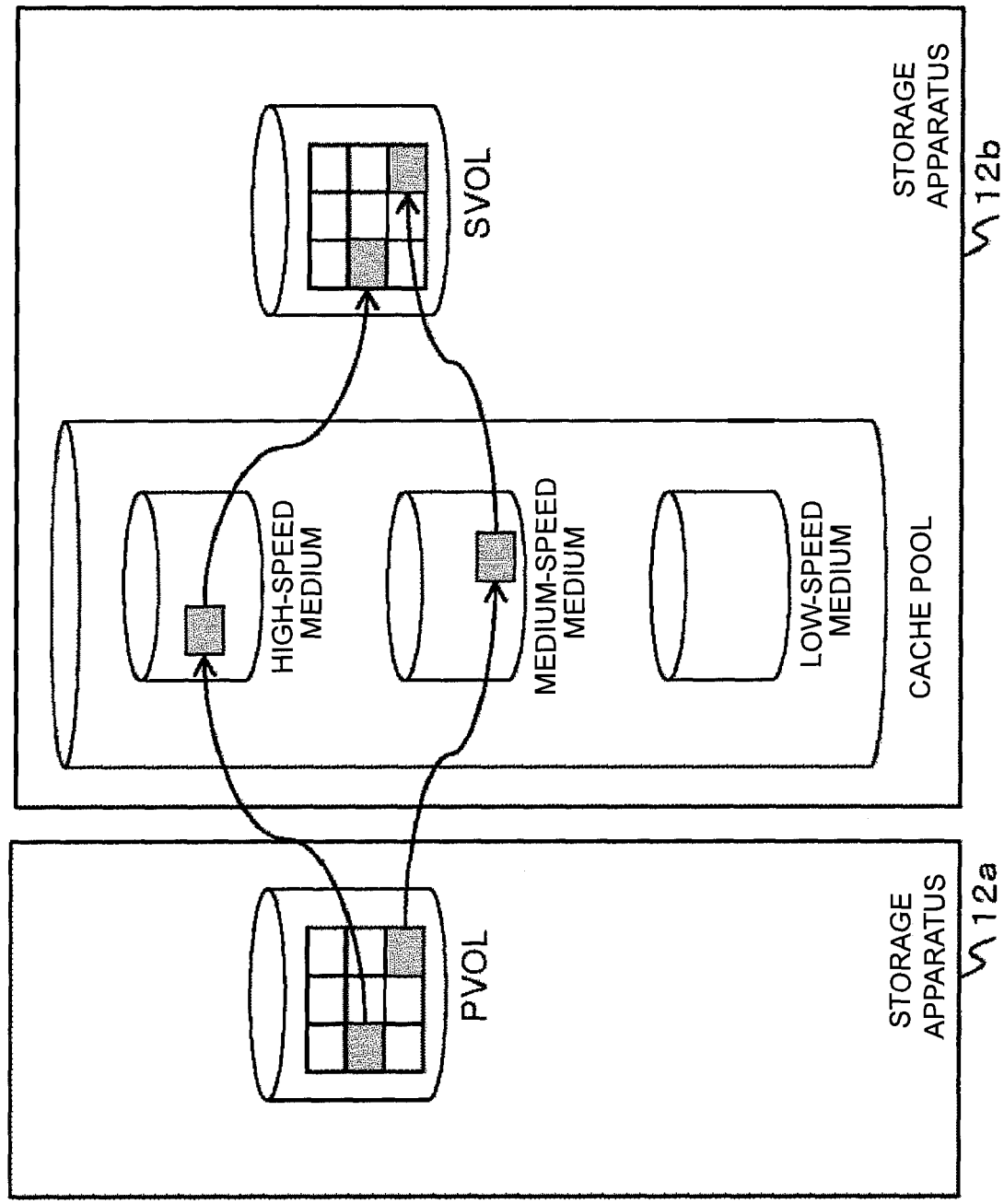
FIG. 13 shows an example of a conceptual diagram according to the second embodiment.

In the environment shown in FIG. 13, data is backed up from the PVOL to the SVOL via the cache pool. The cache pool is a pool in which a plurality of types of media are registered. The plurality of media include a wide variety of media ranging from a high-speed medium to a low-speed medium. FIG. 13 illustrates that the cache pool is contained in the storage apparatus 12*b*, but the cache pool may exist in the storage apparatus 12*a*. Alternatively, the cache pool may be provided at a location other than the storage apparatuses 12*a*, 12*b*. In order to reduce the backup time, differential data is copied and temporarily stored in the high-speed medium stored in the cache pool without copying the data from the PVOL directly to the SVOL. The backup is considered to be completed when copying of the data to the medium in the cache pool is completed, thereby making it possible to reduce the backup time. The backup program 406 selects which medium to write the backup data, based on the amount of differential data to be copied from the PVOL to the SVOL, the performance of the plurality of types of media stored in the cache pool, and the capacity of these media so that the backup will be completed within the BW. However, the differential data may be backed up without the intermediary of the cache pool or only part of the differential data may use the cache pool as long as the backup will be completed within the BW. After copying of the differential data from the PVOL to the cache pool is completed, the differential data is further copied to the SVOL, so that the backup data will eventually be stored in the SVOL. The data is written via the cache pool to the SVOL; and the data can be copied to the same volume LBA in the SVOL as the volume LBA in the PVOL by referring to the differential bitmap 410.

Differential Data Migration Control Processing

Figure 14:
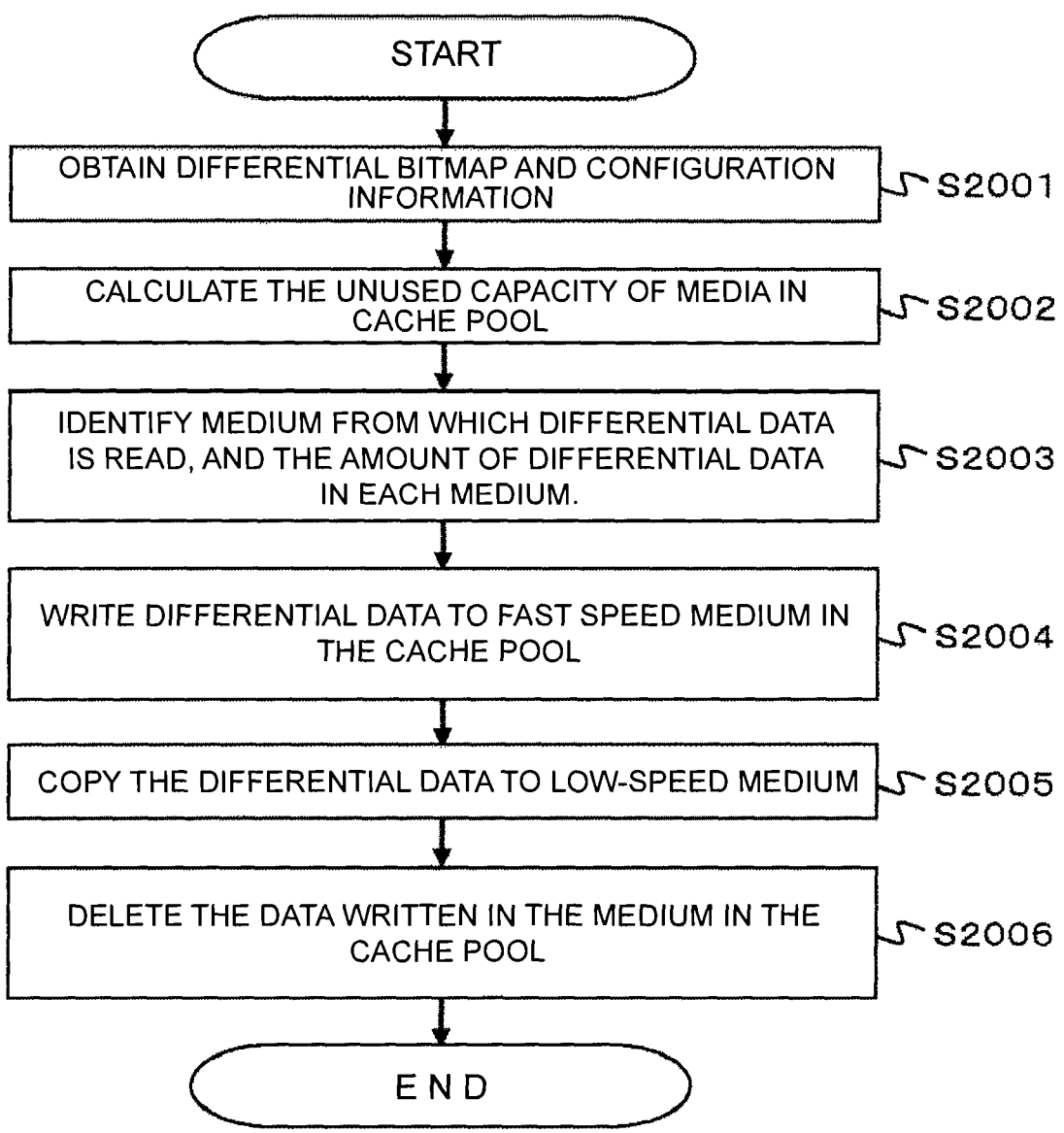
FIG. 14 shows an example of differential data migration control according to the second embodiment.

FIG. 14 illustrates processing executed in the environment where the differential data is controlled on a block basis as shown in FIG. 13. In this environment, the differential data is temporarily stored in a medium in the cache pool that demonstrates a higher speed than the SVOL; and after copying of the differential data to the cache pool is completed, the differential data is further copied from the cache pool to the SVOL.

The above processing also includes a processing sequence for giving a command to copy the differential data, which has been copied to the high-speed medium, to the low-speed medium or the SVOL, so that the high-speed medium can be used again for the next backup.

Processing in step S2001 to step S2006 in FIG. 14 is implemented by the backup program 406 in the memory 404 for on the management computer 40 according to this embodiment. However, the above processing include processing executed by the storage microprogram 115 in the memory 114 for the storage system 10*a*, 10*b*. Regarding this processing like the case mentioned earlier, the location where the backup program 406 is stored is not limited to the management computer 40, and it may be stored in the memory 114 for the storage system 10. A command to the storage apparatus 12 may be given by the storage microprogram 115. In any event, specifically which processing step is implemented by which program may be decided as appropriate according to, for example, a request relating to system designing.

Firstly, processing for controlling copying of differential data on a block basis will be explained with reference to FIG. 14.

In S2001, the backup program 406 in the memory 404 for the management computer 40 obtains the differential bitmap 410 information and configuration information that the storage systems 10*a*, 10*b* have. This processing is the same as the processing in S1002. However, if the management computer 40 has the latest information, this step may not be performed.

In S2002, the backup program 406 calculates the unused capacity of a medium/media in the cache pool. This processing is the same as the processing in S3002 described earlier.

In S2003, the backup program 406 identifies a medium from which the differential data is to be read, and the amount of differential data in each medium based on the differential bitmap 410. In this step, the same processing as the processing in S1003 for identifying the medium from which the differential data is to be read, and the amount of differential data in each medium. The high-speed medium in the SVOL can be used efficiently by identifying blocks in the medium from which the differential data is read. Specifically speaking, copying is completed fast if the differential data read from the high-speed medium in the PVOL is written to the high-speed medium in the SVOL. If the medium from which the differential data is read is the low-speed medium and the high-speed medium is used to write the differential data, the read speed is slow, so that the high-speed medium to write the differential data can no longer be used. The high-speed medium can be used efficiently and repeatedly by copying the data from the high-speed medium in the PVOL to the high-speed medium in the SVOL. However, only the amount of differential data may be determined without executing processing for determining the medium.

In S2004, the differential data is copied from the PVOL to the high-speed medium in the cache pool. Specifically speaking, the backup program 406 gives a command to the storage microprogram 115 for the storage system 10 to copy the differential data in the PVOL to the medium in the cache pool. In this step, whether all the pieces of the differential data can fit in the high-speed medium or not is judged based on the unused capacity of each medium as calculated in S2002; if all the pieces of the differential data cannot fit in the high-speed medium, the backup program 406 gives a command to decide media in descending order of speed and write the differential data by using the media concurrently. Furthermore, if the medium from which the differential data is read is identified in step S2003, the backup program 406 designates a copy destination of the differential data so that a high-speed medium will be used if the high-speed medium is determined to be the medium from which the data is read, or a low-speed medium will be used if the low-speed medium is determined to be the medium from which the data is read. When this happens, the backup program 406 records information about the location in the cache pool to which the data is written from the PVOL. When it is determined that the backup will be completed within the BW, the differential data may be copied from the PVOL directly to the SVOL. The backup of the application data is considered to be completed when copying of the differential data to the medium in the cache pool is completed; and then information is stored in the backup completion time 4093 in the backup schedule table 409. As a result, it is possible to reduce the backup time.

In S2005, the differential data is copied from the high-speed medium in the cache pool to the low-speed medium in the cache pool or the SVOL in order to make the high-speed medium in the cache pool available. This processing is the processing shown in the conceptual diagram in FIG. 13 for copying the differential data from the medium in the cache pool to the SVOL. Specifically speaking, the backup program 406 gives a command to the storage microprogram 115 in the memory 114 for the storage system 10 to copy the differential data. Depending on which storage system stores the cache pool and the SVOL, the command is given to the storage microprogram in the memory 114 for the storage system 10a or 10b in which the cache pool and the SVOL are stored. In this situation, the low-speed medium in the cache pool may be used as the SVOL. When the differential data is to be copied from the medium in the cache pool to the SVOL, the backup program 406 refers to the record created in S2004 about the location in the cache pool, to which the differential data is written from the PVOL, and also refers to the differential bitmap 410, and gives a command to copy the data to the same volume LBA in the SVOL as that in the PVOL.

In S2006, the differential data which has been written to the medium in the cache pool is deleted. As a result, the medium in the cache pool can be utilized for other uses. When copying of the differential data from the medium in the cache pool to the SVOL is completed in S2005, the differential data exist both in the storage area in the cache pool and the storage area in the SVOL. Therefore, the differential data in the cache pool can be deleted. Specifically speaking, the backup program 406 gives a command to the storage microprogram 115 to delete the data. When receiving this command, the storage microprogram 115 deletes the data in the cache pool based on the information created in S2004 about the location to which the differential data is written from the PVOL to the medium in the cache pool. This processing terminates after the deletion.

Third Embodiment

Next, the third embodiment of the present invention will be explained.

The difference between this embodiment and the first and second embodiments is that this embodiment is configured to have one storage system in the computer system according to the first and second embodiments. The following explanation will be mainly focused on the difference between the configuration of this embodiment and the configuration shown in FIG. 1 and this embodiment will describe the case in which this invention is applied to the environment where the number of storage systems is set to one.

Figure 2:
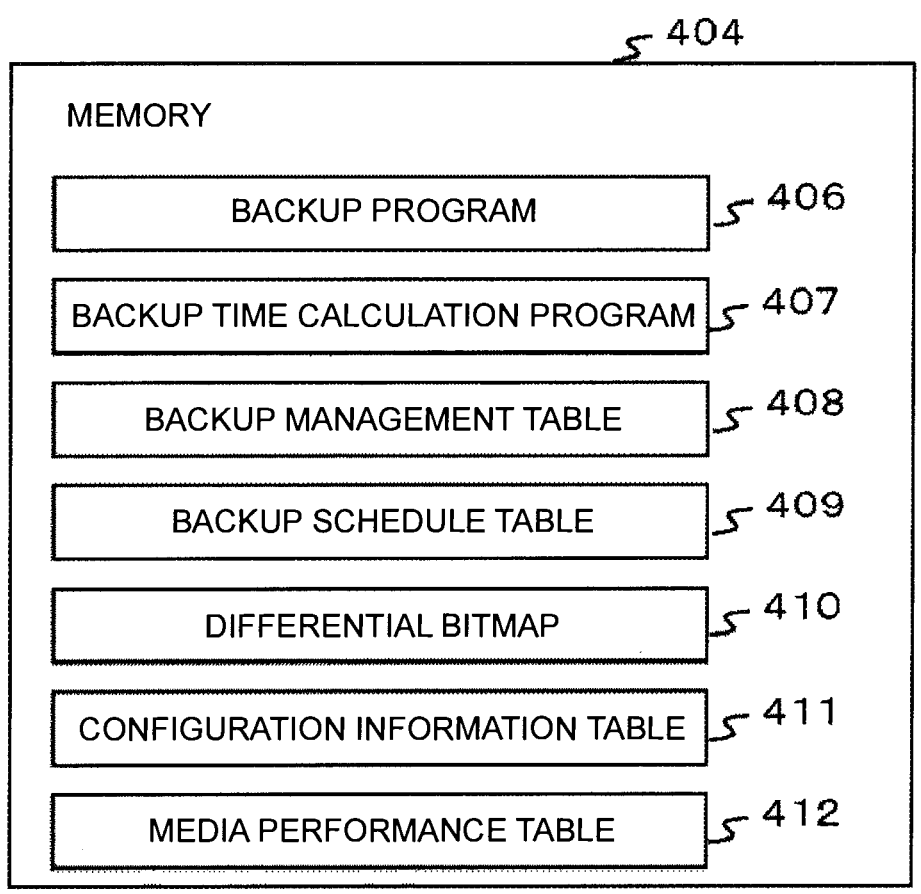
FIG. 2 is a diagram showing an example of programs and information recorded on a memory for a management computer according to the first embodiment.
Figure 15:
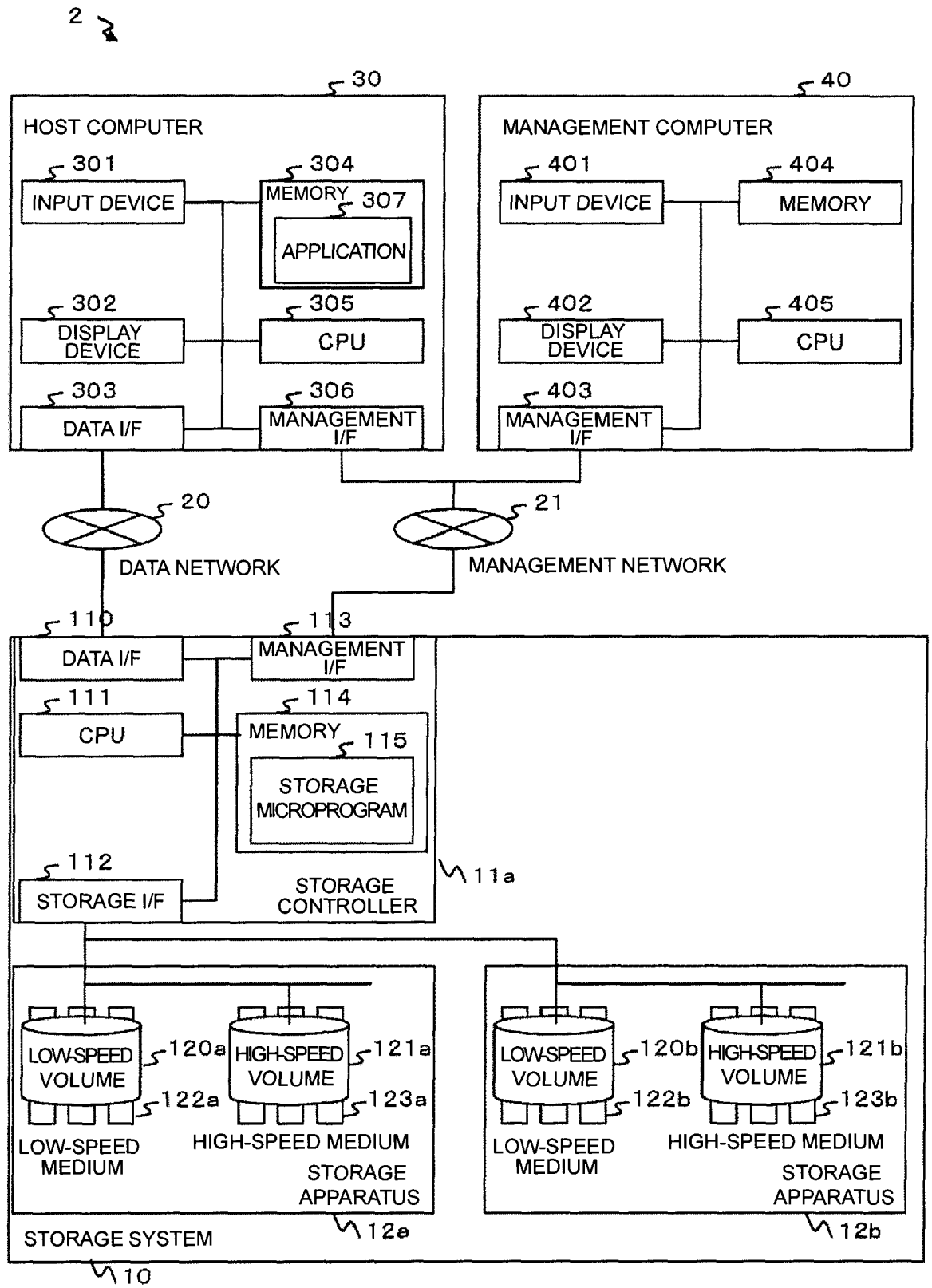
FIG. 15 is a block diagram showing an example of the configuration of a computer system 2 according to the third embodiment.

FIG. 15 shows an example of the system configuration of a computer system 2 according to this embodiment. As shown in FIG. 14 like the computer system shown in FIG. 1, the computer system 2 according to this embodiment is constituted from a storage system 10, a host computer 30, and a management computer 40. The storage system 10, the host computer 30, and the management computer 40 are configured in the same manner as in the first embodiment. A spare volume may be provided as in the first embodiment. Also, the storage system 10 may be provided with a storage apparatus having a spare volume. However, a backup program 406 and a backup time calculation program 407 which are execution programs stored in a memory 404 for the management computer 40 as shown in FIG. 2 may exist in the memory 404 for the management computer 40 in the same manner as in the first embodiment, or in a memory 114 for the storage system 10. Functions belonging to the storage system 10, the host computer 30, and the management computer 40 are the same as those in the first embodiment.

However, the function operating the copy function of the storage microprogram 115 according to the first embodiment was described as copying data from the storage apparatus 12a in the storage system 10a to the storage apparatus 12b in the storage system 10b. In this embodiment, the storage apparatus 12a and the storage apparatus 12b exist in the storage system 10a. In other words, both the PVOL and the SVOL exist in the same storage system.

Various pieces of information used in this embodiment are the same information as that recorded in each table shown in FIG. 3 to FIG. 7 according to the first embodiment. However, these pieces of information in the backup management table 408, the backup schedule table 409, the differential bitmap 410, the configuration information table 411, and the media performance table 412 may exist, like the execution programs, in the memory 114 for the storage system 10. Moreover, since the same value is stored in the PVOL storage ID 4083 and the SVOL storage ID 4085 in the backup management table 408 shown in FIG. 3 according to this embodiment, these pieces of information may be omitted. Specifically speaking, since there is only one storage system which is the objected to be managed, only the ID "ST001" is stored in both the PVOL storage ID 4083 and the SVOL storage ID 4085. Similarly, the storage ID 4110 information in the configuration information table 411 shown in FIG. 6 may be omitted.

Next, BW and media management processing according to this embodiment will be explained.

This processing can be implemented by processing similar to the processing as shown in FIG. 9 according to the first embodiment.

However, the step described below is changed.

In step S1002, the backup program 406 in the memory 404 for the management computer 40 obtains the configuration information from the storage system 10a and the storage system 10b; however, since both the PVOL and the SVOL are stored in the same storage system 10a in this embodiment, the source from which the information is obtained is one storage system.

If the backup program 406, the backup time calculation program 407, the backup management table 408, the backup schedule table 409, the differential bitmap 410, the configuration information table 411, and the media performance table 412 are stored not in the memory 404 for the management computer 40, but in the memory 114 for the storage system 10, the information will not be collected from the management computer 40. Similarly, the processing from S1003 to S1010 is executed by the CPU 111 for the storage system 10 by reading the programs and tables from the memory 114 for the storage system 10.

Next, differential data migration control processing according to this embodiment will be explained.

This processing can be implemented by processing similar to the processing shown in FIG. 11 according to the first embodiment and the processing shown in FIG. 14 according to the second embodiment.

However, the processing step described below is changed as in the aforementioned case.

In step S2001, the backup program 406 in the memory 404 for the management computer 40 obtains the configuration information from the plurality of storage systems 10, but the number of storage systems 10 from which the information is obtained is changed to one (the storage system 10a). If the programs and table information for executing this embodiment are stored in the memory 114 for the storage system 10, the information will not be collected from the management computer 40. Similarly, processing from S2002 to S2009 and processing from S3002 to S3008 are executed by the CPU 111 for the storage system 10 by reading the programs and tables from the memory 114 for the storage system 10. In other words, the backup program 406 in the memory 404 for the management computer 40 gives a command to the storage microprogram in the memory 114 for the storage system 10 in S2004, S2006, S2008, and in S3004 and S3007; however, in this embodiment, the program is executed in the same memory 114 for the same storage system 10.

SVOL Use Processing

Next, SVOL use processing according to this embodiment will be explained.

This processing can be implemented by processing similar to the processing shown in FIG. 13 according to the first embodiment. However, the processing step described below is changed as in the case mentioned earlier.

In step S4004, the backup program 406 in the memory 404 for the management computer 40 gives a command to the storage microprogram in the memory 114 for the storage system 10; however, in this embodiment, the program is executed in the same memory 114 for the same storage system 10.

Fourth Embodiment

Next, the fourth embodiment of this invention will be explained.

The difference between this embodiment and the first to third embodiments is that in this embodiment, a plurality of applications exist in the computer system according to the first to third embodiments and consideration is given to the existence of a plurality of backup tasks using a cache pool at the same time. If a plurality of backup tasks exist at the same time, high-speed media in the cache pool are distributed to each backup task in order of priority for the backup tasks.

The computer system configuration according to this embodiment is similar to that according to the first embodiment and the second embodiment. Alternatively, the computer system configuration according to this embodiment may be similar to that according to the third embodiment where there is only one storage system 10. However, as already explained with regard to the computer system configuration according to the first embodiment, the number of application(s) in the host computer 30 is not limited to one. Particularly in the third embodiment, a plurality of applications or the host computers 30 exist and are managed by the management computer 40.

Next, various pieces of information used in this embodiment will be explained.

FIG. 16 shows a table created by adding a priority 4087 column to the backup management table 408 shown in FIG. 3. The priority 4087 is a policy used by the administrator to prioritize deciding an application to complete the backup within the BW from among the plurality of applications which are backup targets, using the limited media. Specifically speaking, the high-speed medium are preferentially allocated to the applications in order of priority. The priority 4087 stores, for example, "high" or "low"; however, any other expressions such as marks or numbers may be used as long as the priority of the applications to comply with the BW can be expressed. Other various pieces of information used in this embodiment are the same as those recorded in each table shown from FIG. 4 to FIG. 7 relating to the first embodiment.

Figure 17:
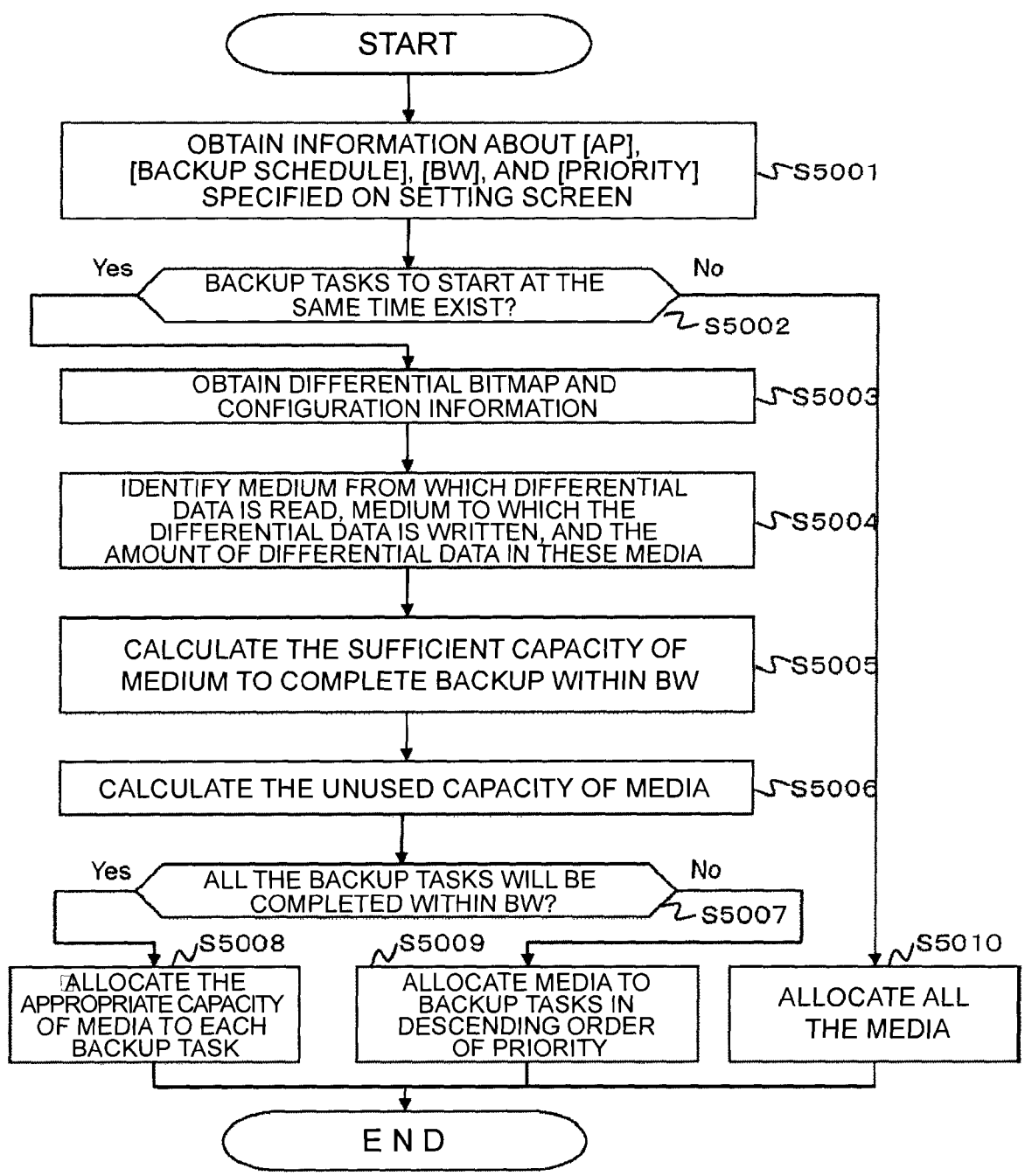
FIG. 17 shows an example of differential data migration control when a plurality of backup tasks are executed simultaneously according to the fourth embodiment.

Next, processing for controlling a copy destination of differential data during a backup of the plurality of applications according to this embodiment will be explained. This processing is executed in the environment where both the high-speed medium and the low-speed medium exist in the cache pool. A medium which is a copy destination (to which the differential data is copied) and reduces the backup speed is controlled in this environment. FIG. 17 shows an example of differential data migration control processing when multiple backup tasks are executed at the same time. It should be noted that the backup setting is made for the plurality of applications in this embodiment, and how to use the cache pool in which the multiple tasks exist at the same time will be explained. This processing can be also executed in the environment where the differential data is controlled both on a block basis and on a page basis as shown in FIG. 11 and FIG. 12 according to the first embodiment.

Processing from step S5001 to step S5011 in FIG. 17 is implemented by the backup program 406 and the backup time calculation program 407 in the memory 404 for the management computer 40 and the storage microprogram 115 in the memory 114 for the storage system 10a, 10b according to this embodiment. Regarding this processing like the case mentioned earlier, the location where the backup program 406 is stored is not limited to the management computer 40, but the backup program 406 may be stored in the memory 114 for the storage system 10 and a command to the storage apparatus 12 may be given by the storage microprogram 115. In any event, specifically which processing step is implemented by which program may be decided as appropriate according to, for example, a request relating to system designing.

Differential data migration control processing when the multiple backup tasks are executed at the same time will be explained with reference to FIG. 17.

In S5001, the backup program 406 in the memory 404 for the management computer 40 obtains information, which has been input by the administrator to the backup setting screen, about applications which are backup targets, a backup schedule indicating a time interval or a date and time for obtaining backup data, the BW indicating a target time to complete a backup, and the priority to complete the backup within the BW by prioritizing the plurality of applications. This step is processing obtained by adding the acquisition of the priority information to step S1001 in the BW and media management processing (FIG. 9) according to the first embodiment. The information obtained in the same manner as in S1001 is stored in the backup management table 408 which is stored in the memory for the management computer 40. The priority information is stored in the priority 4087 in the backup management table 408 shown in FIG. 15.

In S5002, the backup program 406 refers to the backup start time 4092 in the backup schedule table 409 shown in FIG. 4 and checks if backup tasks exist at the same time. If the backup tasks are to be started at the same time, the processing proceeds to step S5003; and if the backup tasks are not to be started at the same time, the processing proceeds to step S5010. For example, FIG. 4 shows that backup tasks with the backup IDs 4090 "BK002" and "BK003" are started at the same time at "23:00 on 2009/12/1" as shown in the backup start time 4092.

Processing from S5003 to S5009 is executed on the plurality of backup target applications for which backups are started at the same time.

In S5003, the backup program 406 obtains the differential bitmap 410 information and the configuration information that the storage systems 10a, 10b have. This step is the same processing as step S1002 in the BW and media management processing (FIG. 9) according to the first embodiment.

In S5004, the backup program 406 identifies a medium from which the differential data is to be read, a medium to which the differential data is to be written, and the amount of differential data in each medium based on the differential bitmap 410 obtained in S5003. This step is the same processing as that in S1003 in the BW and media management processing (FIG. 9) according to the first embodiment.

In S5005, the backup time calculation program 407 calculates the sufficient medium capacity to complete the backup within the BW. This step is the same processing as that in S1009 in the BW and media management processing (FIG. 9) according to the first embodiment.

In S5006, the backup program 406 calculates the unused capacity of media. The backup program 406 searches the volume ID 4117 in the configuration information table 411 for unallocated media and calculates the capacity of unused media from the capacity 4116.

In S5007, the backup program 406 judges whether all the backup tasks will be completed within the BW. Specifically speaking, if the capacity calculated in S5006 is equal to or more than the capacity calculated in S5005, the backup program 406 determines that all the backup tasks will be completed within the BW. If all the backup tasks will be completed within the BW, the processing proceeds to step S5008; and if all the backup tasks will not be completed within the BW, the processing proceeds to step S5009.

In S5008, the backup program 406 allocates a medium, which will complete the backup within the BW, to each backup task. It was found in S5007 that sufficient media are secured to allow all the backup tasks to be completed within the BW. Therefore, the medium capacity calculated in S5005 is allocated to each backup task. If some high-speed media are left unused, the high-speed media may be allocated equally to each backup task in order to reduce the backup time.

In S5009, the backup program 406 allocates the high-speed media to the backup tasks in descending order of the priority 4083 in the backup management table 408. It was found in S5007 that sufficient media to allow all the backup tasks to complete backups within the BW do not exist. Therefore, sufficient media are distributed in descending order of priority in order to complete the backups within the BW. For the application whose priority is low and to which no medium has been allocated, the backup program 406 may execute the processing from S1004 to S1007 in FIG. 9, calculate the backup time, and calculate the capacity necessary to complete the backups within the BW based on the necessary capacity calculated in S5005 and the actually allocated capacity; and then report that the backups will not be completed within the BW, and present the calculated medium capacity in the same manner as in the processing step S1010 in FIG. 9.

In S5010, the backup program 406 allocates all the high-speed media. This is because it was found in S5002 that there is no backup tasks to be started at the same time and, therefore, all the high-speed media can be allocated to one backup task. However, the backup may not necessarily be completed within the BW even if all the high-speed media are allocated. Therefore, the backup time and the sufficient medium capacity to complete the backup within the BW may be calculated by means of the processing from S1002 to S1010 in FIG. 9.

After the command for S5008, S5009, or S5010 is completed, the processing proceed to the differential data migration control by means of the processing in FIG. 11 or FIG. 14, thereby terminating this processing.

Fifth Embodiment

Next, the fifth embodiment of the present invention will be explained.

This embodiment describes an example of a method for calculating the medium capacity according to the first to fourth embodiments. This can be implemented by processing similar to that shown in FIG. 9 according to the first embodiment. However, the processing step described below is changed, so the difference will be explained below.

In S1009, the backup time calculation program 407 calculates the sufficient medium capacity to complete the backup within the BW.

Figure 19:
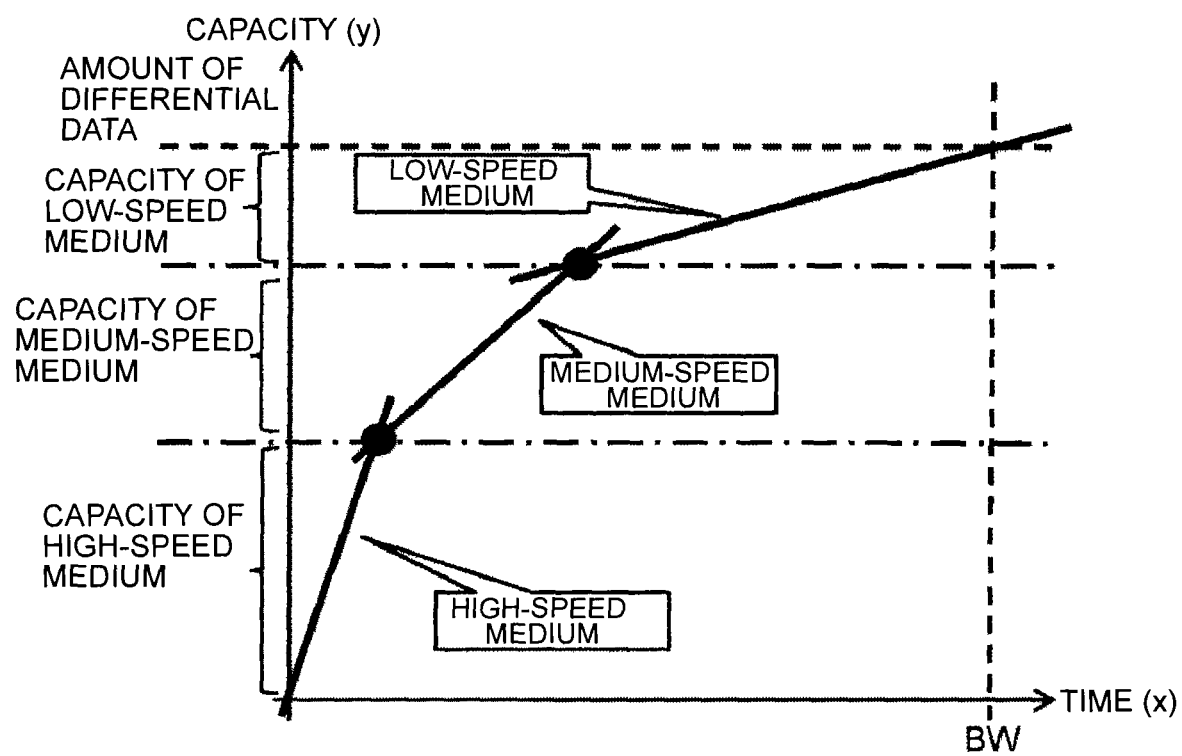
FIG. 19 shows an example of a method for calculating the capacity of media according to the fifth embodiment.

FIG. 19 shows an example of the medium capacity calculation method when three types of media, a high-speed medium, a medium-speed medium, and a low-speed medium, are used. Similarly to the case shown in FIG. 18, the capacity of each medium necessary to complete the backup within the BW can be calculated from an intersection of straight lines representing the performance of the media. The medium capacity calculation method includes the following methods.

If the backup will not be completed even if all the high-speed media are used, the capacity of the high-speed medium necessary to complete the backup within the BW is calculated. Furthermore, the capacity of the high-speed medium to be used may be designated in advance and the capacity of the medium-speed medium necessary to complete the backup within the BW may be calculated. Consequently, the specified capacity can be secured for the high-speed medium, which can also be used for other processing. Furthermore, a command may be given to not use the high-speed medium and the capacity of the medium-speed medium necessary to complete the backup within the BW may be calculated. In this case, the high-speed medium may be utilized for other uses.

If a plurality of backup tasks are executed as in the fourth embodiment, the medium capacity can be calculated by selecting and using either the high-speed medium or the medium-speed medium for each backup task. In this case, the high-speed medium and the medium-speed medium may be allocated depending on the priority 4087.

In S1012, the backup program 406 reports to the administrator that the backup will not be completed within the BW; and also presents the capacity of difference between the capacity of the high-speed medium belonging to the pool and the capacity of the high-speed medium as calculated in S1009. For example, a screen shown in FIG. 20 is displayed on the display device 402 for the management computer 40. FIG. 20 shows the calculated capacity for each medium type. The cost of the unit capacity for each medium may be input and the medium with the lowest cost may be displayed.

What is claimed is:

1. A backup method for a computer system including a management computer, a first storage apparatus connected to the management computer, and a second storage apparatus connected to the management computer and the first storage apparatus, the method comprising:

based on a read speed for a first storage area belonging to the first storage apparatus, a write speed for a second storage area belonging to the second storage apparatus, a write speed for a third storage area, which belongs to the second storage apparatus and whose write speed is faster than that of the second storage area, and an amount of differential data that is part of the data in the first storage area and that is not stored in the second storage area, calculating, by the management computer, a capacity of the third storage area to complete copying of the differential data within a specified period of time; and when a capacity of the third storage area is larger than the calculated capacity, copying, by the second storage apparatus, the differential data, which has been sent from the first storage area, to the second storage area or the third storage area and migrating the differential data, which has been copied to the third storage area, to the second storage area.

2. The backup method for the computer system according to claim 1, further comprising:

providing, by the second storage apparatus, a virtual volume allocated to the second storage area; and allocating the calculated capacity of the third storage area to the virtual volume.

3. The backup method for the computer system according to claim 2, further comprising:

if the capacity of the third storage area is smaller than the calculated capacity, calculating, by the management computer, a difference between the calculated capacity and the capacity of the third storage area; and if a fourth storage area which has at least the capacity of the calculated difference and whose write speed is faster than that of the second storage area is added, allocating, by the second storage apparatus, the third storage area and the added fourth storage area to the virtual volume, copying the differential data, which has been sent from the first storage area, to the third storage area or the fourth storage area, and migrating the copied differential data to the second storage area.

4. The backup method for the computer system according to claim 3, wherein the differential data is controlled on a segment basis, each segment being composed of a plurality of blocks, and further comprising:

specifying, by the management computer, an updated block of one of the segments, migrating a segment stored in the second storage area, to which the updated block is to be copied, to the third storage area or the fourth storage area, copying the updated block to the migrated segment, and migrating the segment, to which the updated block has been copied, to the second storage area.

5. The backup method for the computer system according to claim 4, wherein from among the segments, segments are copied in descending order of the number of updated blocks to the third storage area or the fourth storage area.

6. The backup method for the computer system according to claim 5, wherein the computer system further includes a host computer connected to the first storage apparatus, wherein a plurality of applications operate on the host computer; differential data is written from each of the plurality of applications to the first storage area; and when the differential data is backed up from the first storage apparatus to the second storage apparatus, the differential data is copied from the first storage area to the third storage area in descending order of priority of the plurality of applications.

7. The backup method for the computer system according to claim 6, wherein the management computer has a display unit and further comprising:

displaying the capacity of the calculated difference on the display unit.

8. A computer system comprising:

a management computer;

a first storage apparatus that is connected to the management computer and has a first storage area; and a second storage apparatus that is connected to the management computer and the first storage apparatus and has a second storage area, in which a copy of data in the first storage area is stored, and a third storage area with a write speed that is faster than a write speed of the second storage area; and wherein based on a read speed for the first storage area, the write speed for the second storage area, the write speed for the third storage area, and an amount of differential data that is part of the data in the first storage area and that is not stored in the second storage area, the management computer is configured to calculate a capacity of the third storage area to complete copying of the differential data within a specified period of time; and when a capacity of the third storage area is larger than the calculated capacity, the second storage apparatus is configured to copy the differential data, which has been sent from the first storage area, to the second storage area or the third storage area and migrate the differential data, which has been copied to the third storage area, to the second storage area.

9. The computer system according to claim 8, wherein the second storage apparatus is configured to provide a virtual volume allocated to the second storage area and allocate the calculated capacity of the third storage area to the virtual volume.

10. The computer system according to claim 9, wherein if the capacity of the third storage area is smaller than the calculated capacity, the management computer is configured to calculate a difference between the calculated capacity and the capacity of the third storage area; and wherein if a fourth storage area which has at least the capacity of the calculated difference and whose write speed is faster than that of the second storage area is added, the second storage apparatus is configured to allocate the third storage area and the added fourth storage area to the virtual volume copy the differential data, which has been sent from the first storage area, to the third storage area or the fourth storage area, and migrate the copied differential data to the second storage area.

11. The computer system according to claim 10, wherein the differential data is controlled on a segment basis, each segment being composed of a plurality of blocks, and the management computer is configured to specify an updated block of one of the segments, migrate a segment stored in the second storage area, to which the updated block is to be copied, to the third storage area or the fourth storage area, copy the updated block to the migrated segment, and migrate the segment, to which the updated block has been copied, to the second storage area.

12. The computer system according to claim 11, wherein from among the segments, segments are copied in descending order of the number of updated blocks to the third storage area or the fourth storage area.

13. The computer system according to claim 12, further comprising a host computer connected to the first storage apparatus,
wherein a plurality of applications operate on the host computer; differential data is written from each of the plurality of applications to the first storage area; and when the differential data is backed up from the first storage apparatus to the second storage apparatus, the differential data is copied from the first storage area to the third storage area in descending order of priority of the plurality of applications.

14. The computer system according to claim 13, wherein the management computer has a display unit and is configured to display the capacity of the calculated difference on the display unit.

15. A non-transitory computer readable medium having machine instructions stored therein, the instructions being executable by a computer system including a management computer, a first storage apparatus connected to the management computer, and a second storage apparatus that is connected to the management computer and the first storage apparatus, and causing the computer system to perform operations comprising:
based on a read speed for a first storage area belonging to the first storage apparatus, a write speed for a second storage area belonging to the second storage apparatus, a write speed for a third storage area, which belongs to the second storage apparatus and whose write speed is faster than that of the second storage area, and an amount of differential data that is part of the data in the first storage area and that is not stored in the second storage area, calculating a capacity of the third storage area to complete copying of the differential data within a specified period of time; and
when a capacity of the third storage area is larger than the calculated capacity, copying the differential data, which has been sent from the first storage area, to the second storage area or the third storage area and migrating the differential data, which has been copied to the third storage area, to the second storage area.

16. The non-transitory computer readable medium according to claim 15, the instructions further comprising:
executing processing for providing a virtual volume allocated to the second storage area and allocating the calculated capacity of the third storage area to the virtual volume.

17. The non-transitory computer readable medium according to claim 16, the instructions further comprising:
if the capacity of the third storage area is smaller than the calculated capacity, calculating a difference between the calculated capacity and the capacity of the third storage area; and
if a fourth storage area which has at least the capacity of the calculated difference and whose write speed is faster than that of the second storage area is added, executing processing for allocating the third storage area and the added fourth storage area to the virtual volume, coping the differential data, which has been sent from the first storage area, to the third storage area or the fourth storage area, and migrating the copied differential data to the second storage area.

18. The non-transitory computer readable medium according to claim 17, wherein the differential data is controlled on a segment basis, each segment being composed of a plurality of blocks, and the instructions further comprising:
executing processing for specifying an updated block of one of the segments, migrating a segment stored in the second storage area, to which the updated block is to be copied, to the third storage area or the fourth storage area, copying the updated block to the migrated segment, and migrating the segment, to which the updated block has been copied, to the second storage area.

19. The non-transitory computer readable medium according to claim 18, the instructions further comprising:
executing processing for copying segments, from among the segments, in descending order of the number of updated blocks to the third storage area or the fourth storage area.

20. The non-transitory computer readable medium according to claim 19, the instructions further comprising:
if a plurality of applications operate on a host computer connected to the first storage apparatus and differential data is written from each of the plurality of applications to the first storage area, and when the differential data is backed up from the first storage apparatus to the second storage apparatus, executing processing for copying the differential data from the first storage area to the third storage area in descending order of priority of the plurality of applications.

* * * * *